United States Patent [19]

Chan

[11] Patent Number: 4,602,859

[45] Date of Patent: Jul. 29, 1986

[54] AUTOMATIC FILM-TRANSPORT MECHANISM FOR A DISC CAMERA

[75] Inventor: Kwok Y. Chan, Quarry Bay, Hong Kong

[73] Assignee: W. Haking Enterprises Limited, North Point, Hong Kong

[21] Appl. No.: 536,251

[22] Filed: Sep. 27, 1983

[51] Int. Cl.⁴ .................... G03B 1/00; G03B 17/42; G03B 19/02

[52] U.S. Cl. ................ 354/121; 354/204; 354/207

[58] Field of Search .............. 354/121, 204, 207

[56] References Cited

U.S. PATENT DOCUMENTS

| | | |
|---|---|---|
| 1,960,998 | 5/1934 | Hindley . |
| 2,625,087 | 1/1953 | Steineck . |
| 4,202,614 | 5/1980 | Harvey ........................ 354/121 |
| 4,449,806 | 5/1984 | Wong et al. ................ 354/121 |
| 4,492,444 | 1/1985 | Wolcott ..................... 354/121 |

*Primary Examiner*—Michael L. Gellner
*Attorney, Agent, or Firm*—Russell E. Hattis; Stephen R. Arnold

[57] ABSTRACT

A completely mechanical disc film camera features film advance and shutter actuation by direct mechanical coupling to an external shutter release button. Shutter button actuation is automatically blocked after the fifteenth frame so as to prevent double exposure and film tearing. Selective film-flattening back pressure is applied to the disc film cassette during the terminal phase of the shutter depression stroke immediately prior to shutter tripping so as to hold the film in the proper imaging plane. Back pressure is released during the film advancing phase to as to relieve system loads and avoid film scratching. The film advance is secured by the oscillatory movement of a film notch engaging pawl carried by a claw driven into oscillatory motion by operation of the shutter button. Means are provided for coupling additional mass to the claw during the terminal phase of the film advancing stroke to reduce the speed of film advance, thereby providing protection against film overtravel. To provide for proper initial film advance when a fresh cassette is inserted an automatic film advancing operation is carried out responsive to closure of the door loading system.

13 Claims, 30 Drawing Figures

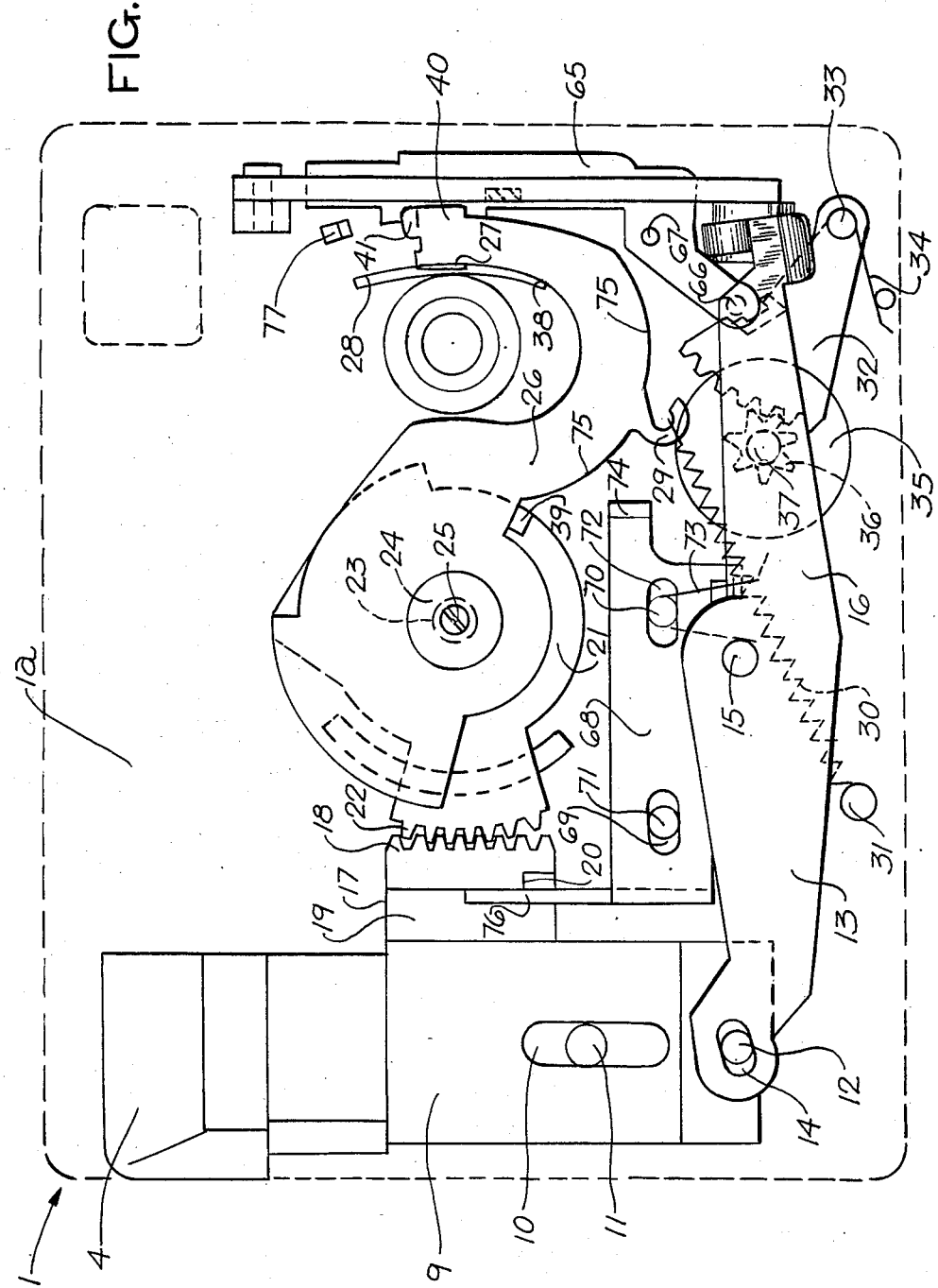

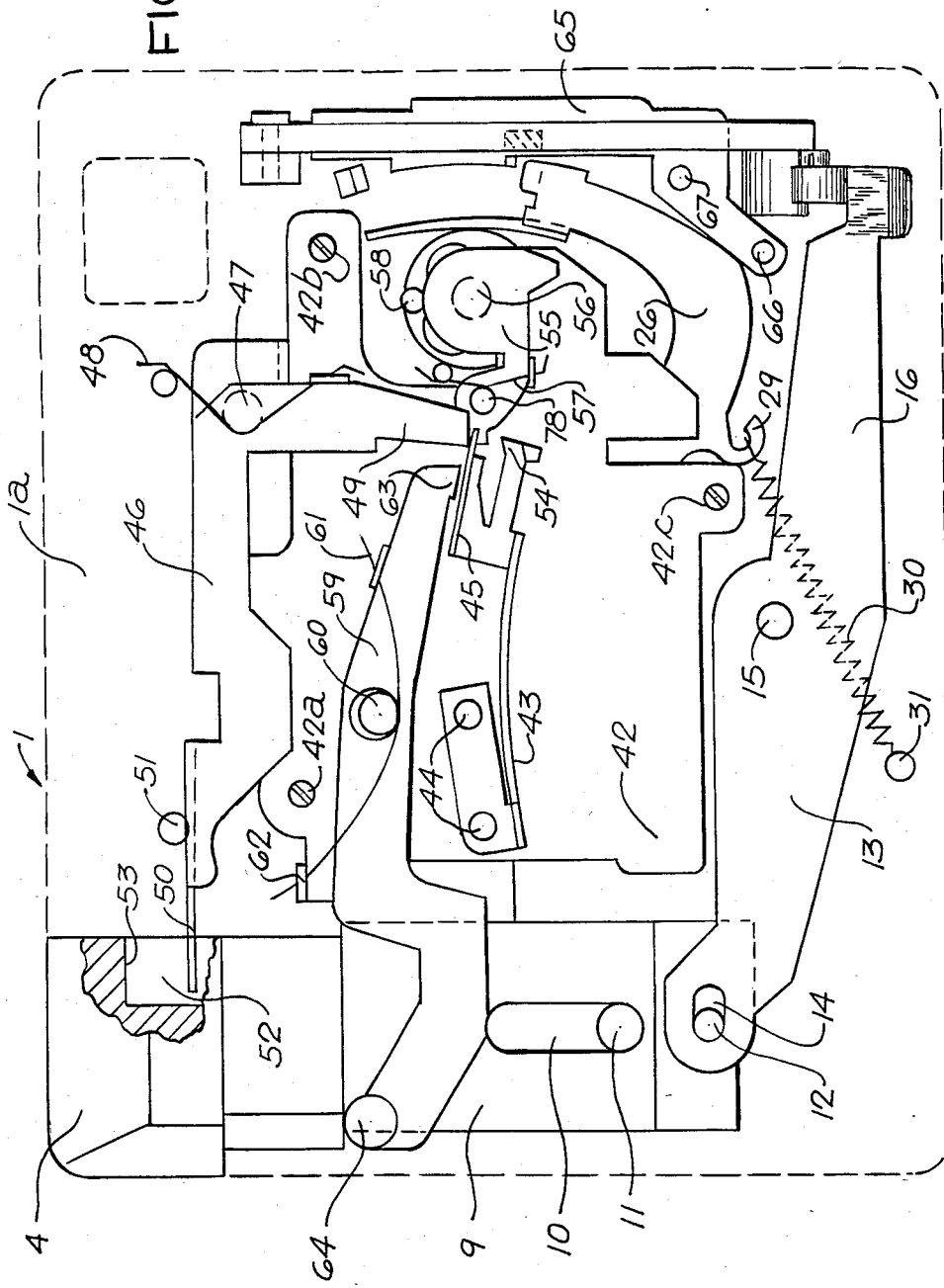

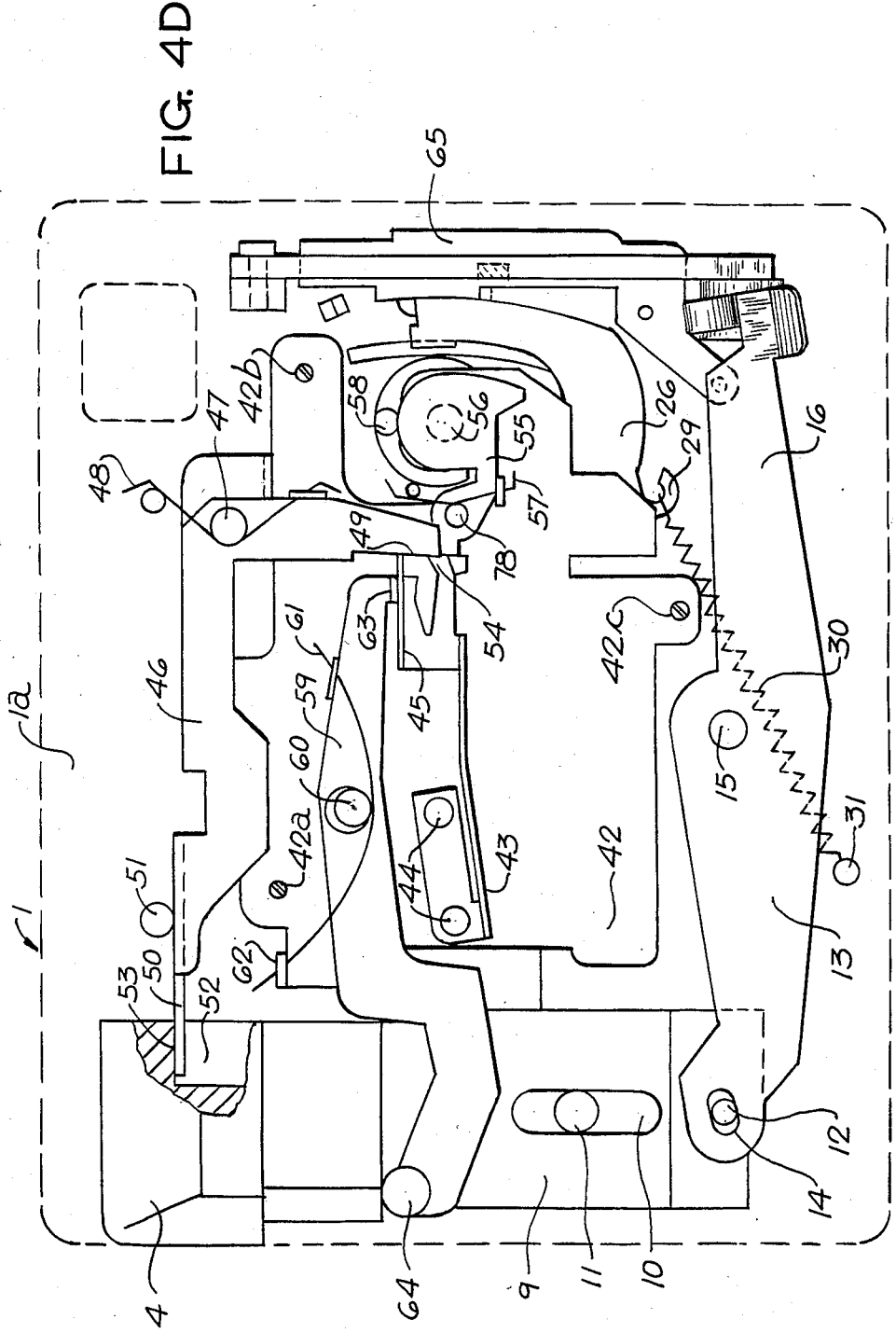

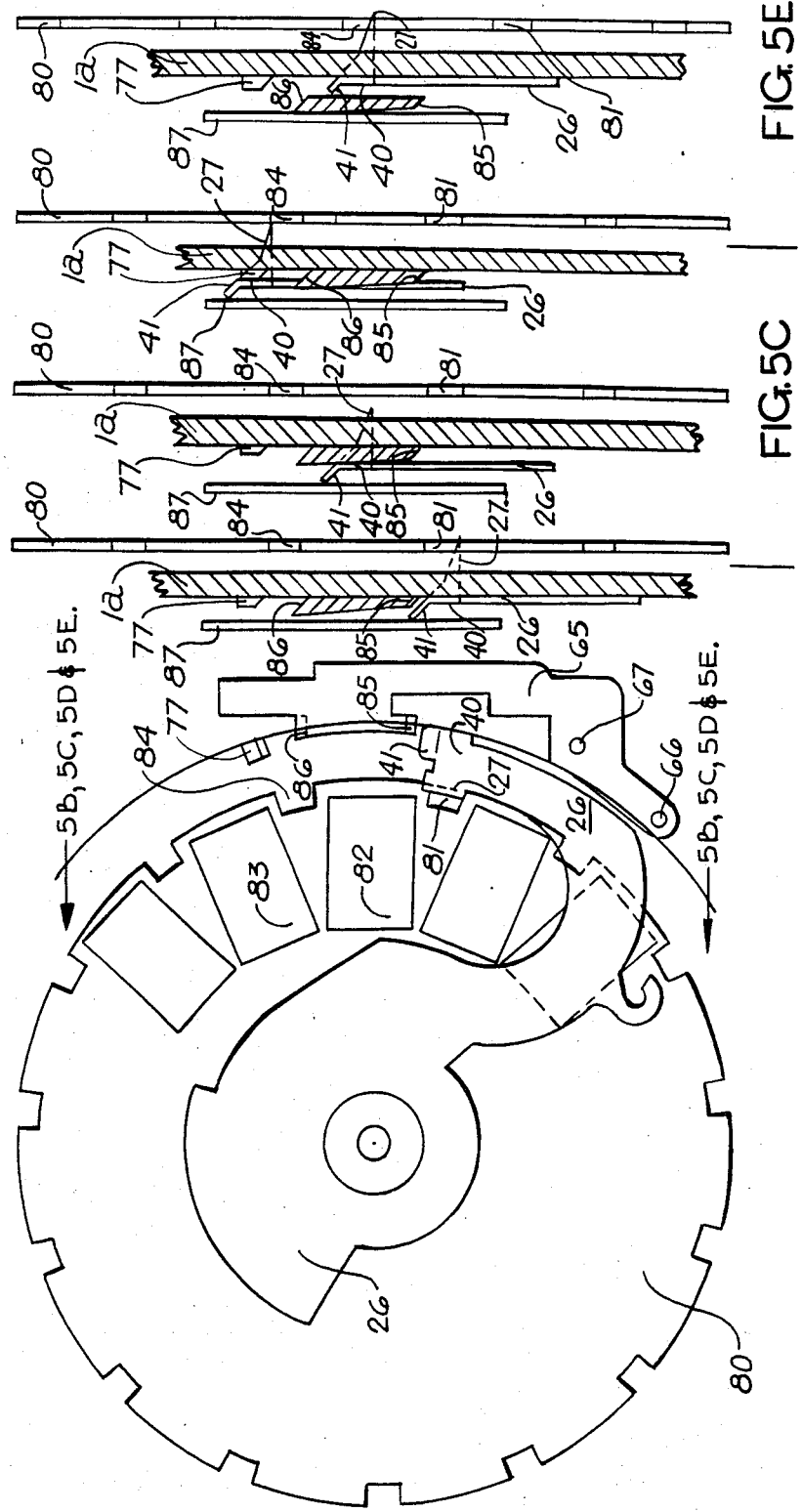

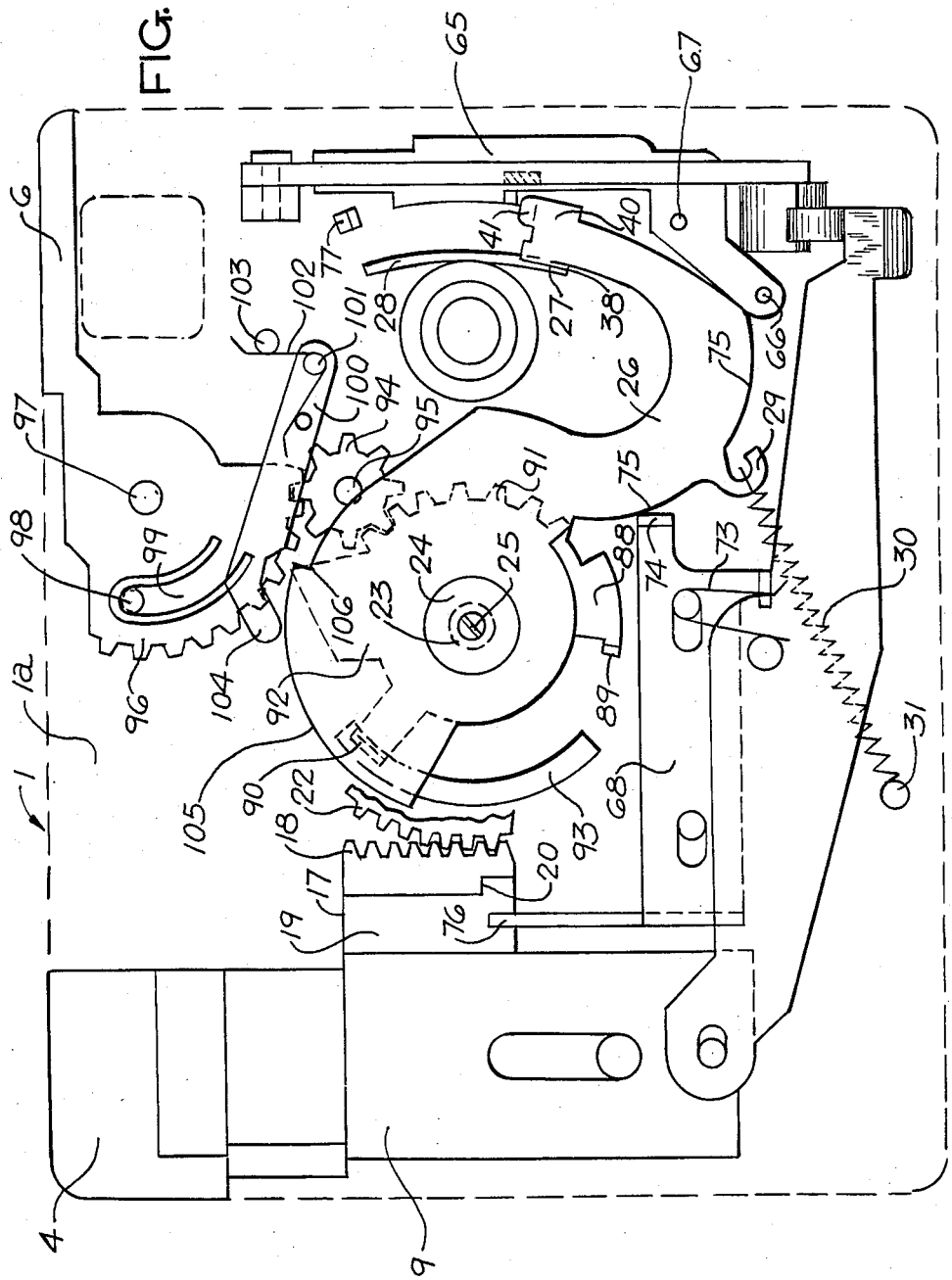

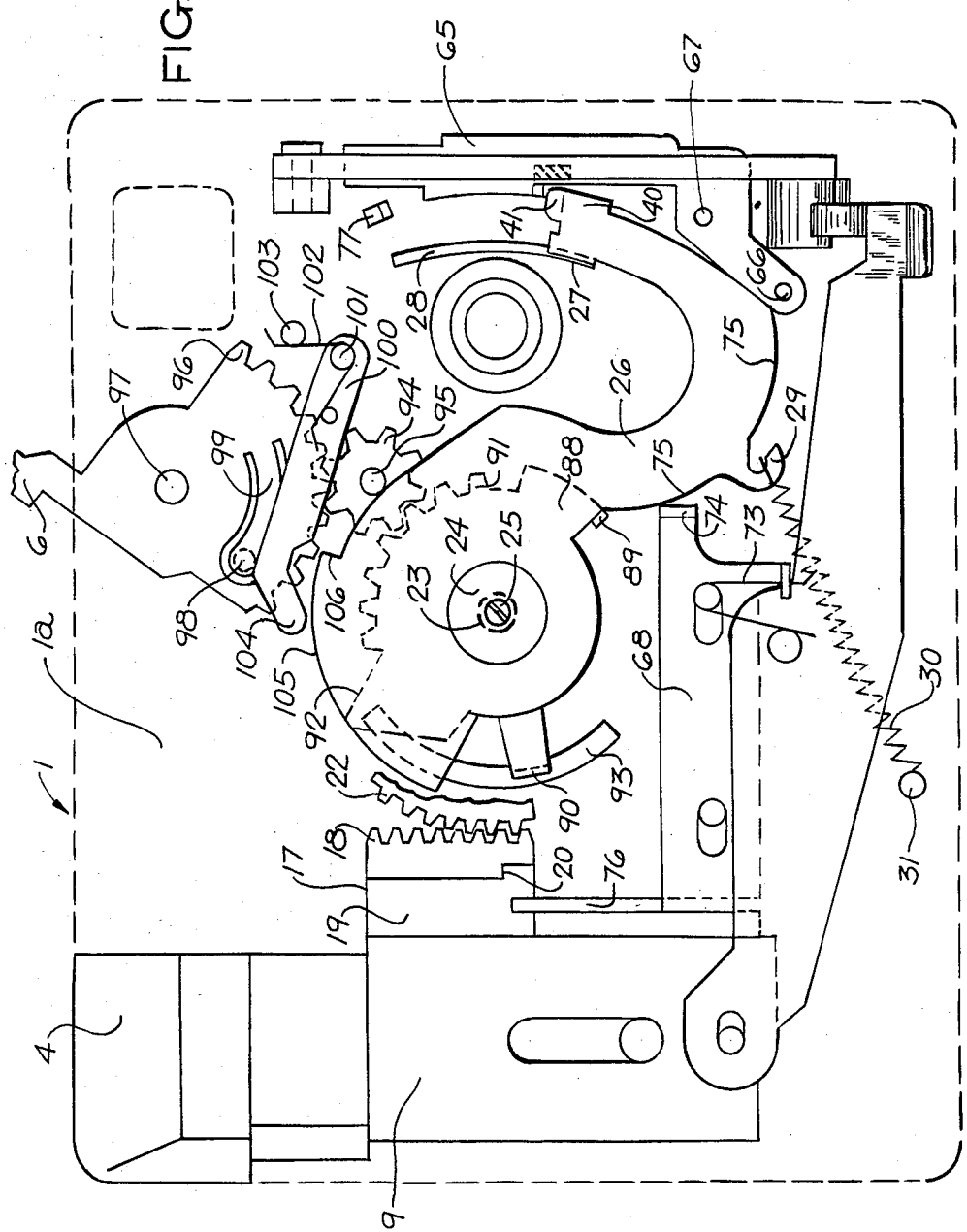

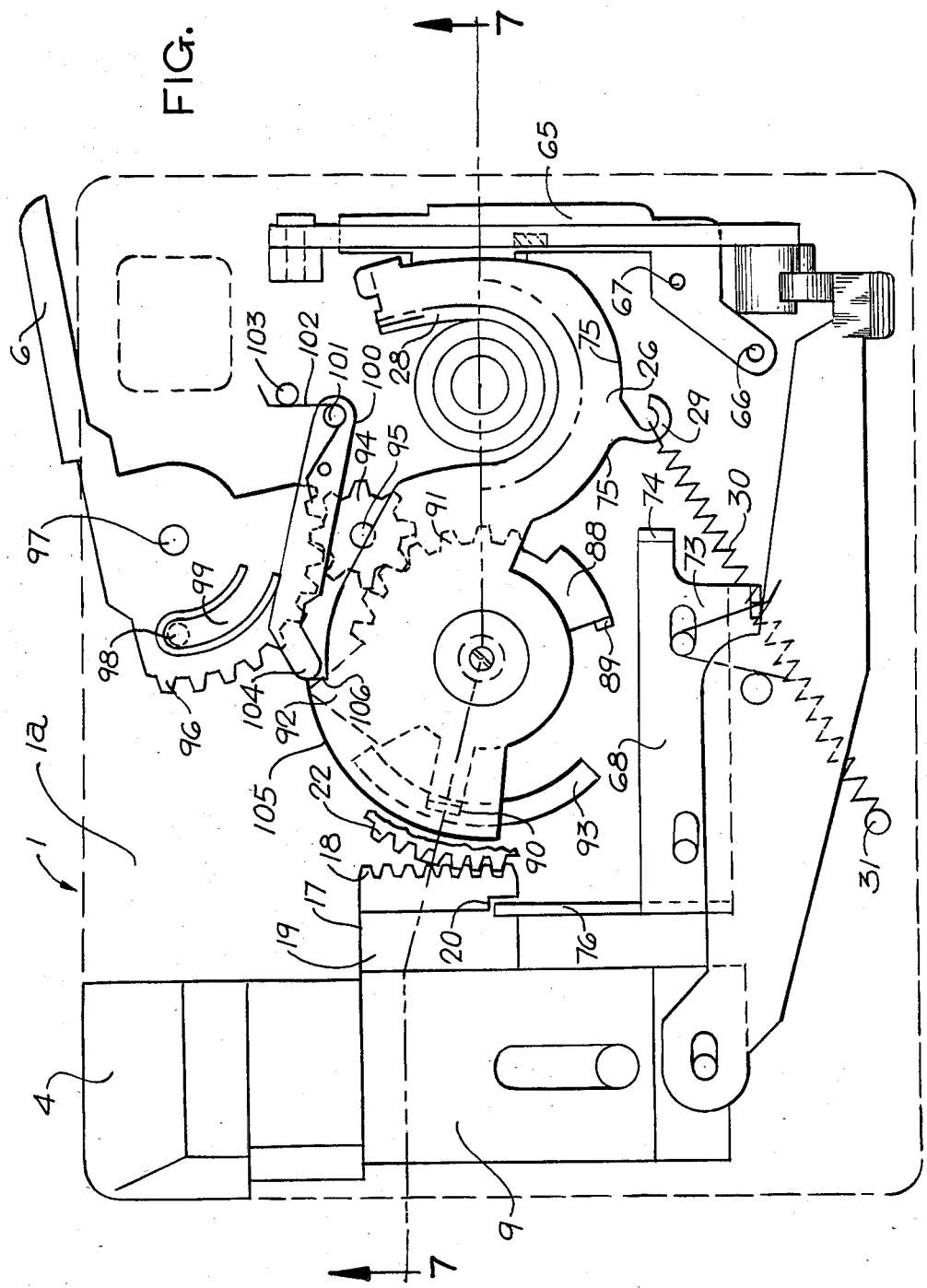

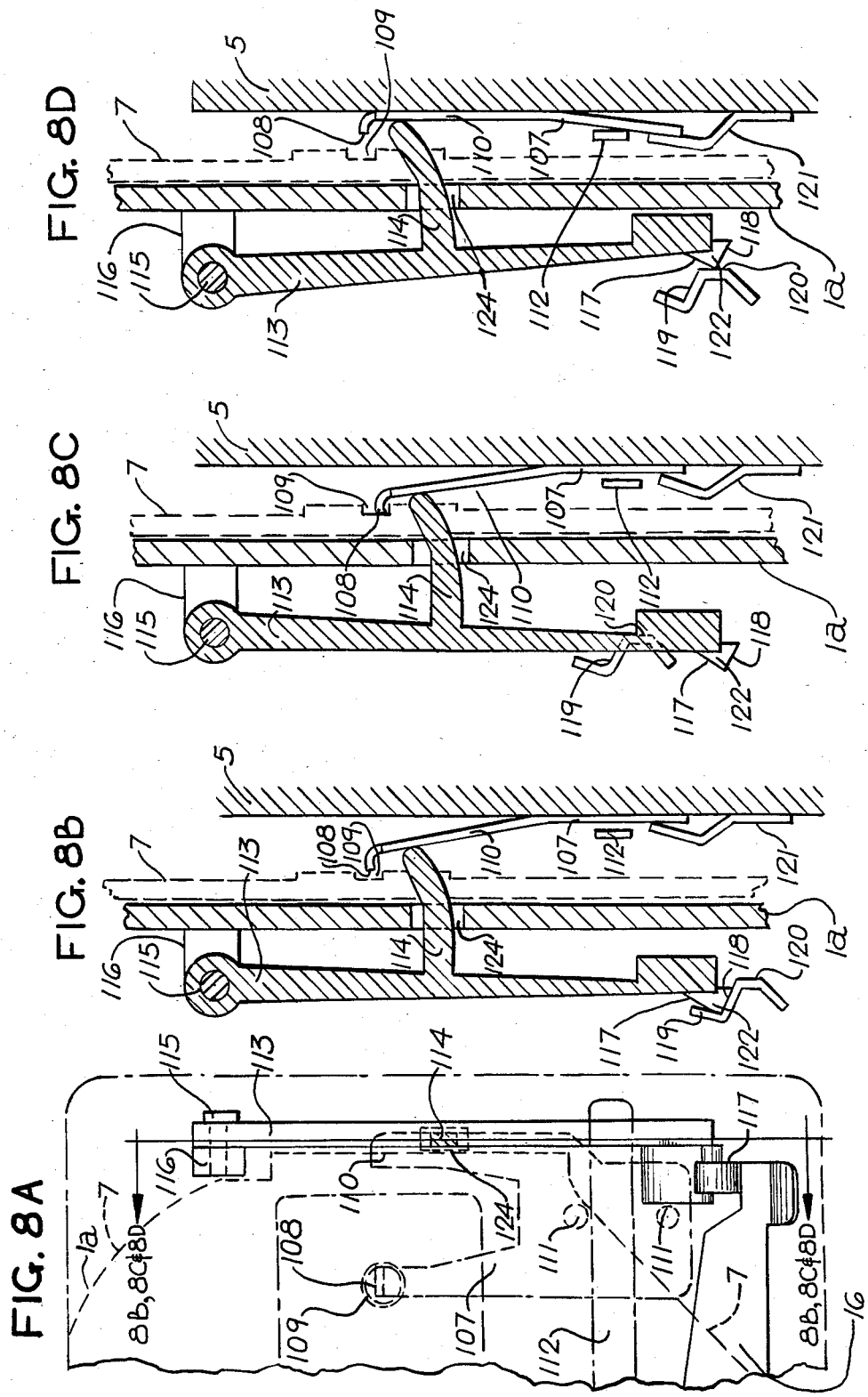

AUTOMATIC FILM-TRANSPORT MECHANISM FOR A DISC CAMERA

TECHNICAL FIELD OF THE INVENTION

The technical field of the invention is the still camera art, in particular film transport mechanisms for disc cameras.

BACKGROUND OF INVENTION

The present invention applies to still cameras which use the commonly available disc film cassettes. Unlike the conventional roll type films, such disc film is packed in a cartridge or cassette of thin section. It is in the form of a flat circular disc which contains exposure frames symmetrically located about the center of the disc. On the periphery of the disc are notches, respectively located opposite the various exposure frames. The notches are used for frame positioning. Conventionally the disc film has been rotated from its center hub to advance it one frame length after each exposure.

Most still cameras currently available on the market have film-transport mechanisms generally classified into three categories. The first type is a mechanical device that requires the camera user to push a film-advance slide once (or more than once) or to rotate a film-winding knob in order to transport a fresh exposure frame into the imaging position subsequent to a previous shutter release. In addition to possible manual focusing and exposure settings, the camera user has to make two operations in order to take a picture, i.e. to advance the film and then to depress a shutter release button.

In the second type of camera, the film-transport mechanism is a spring-wind mechanism in which a strong spring must be pre-tensioned by the camera user by the rotation (typically several revolutions) of a spring winding knob. Such a mechanism can also be considered as a semi-automatic device because, during most of the time, only one operation is required by the user to take a picture (apart from focusing and exposure adjustments), i.e. to depress a shutter release button. Subsequent to each shutter release, the pre-tensioned spring releases a portion of its stored energy to drive the mechanism for film-transport. When the pre-tensioned spring has become slackened after several exposures it has to be rewound again by the camera user. Examples of such cameras are disclosed in U.S. Pat. Nos. 3,685,414 (Good) and 4,226,517 (Skarman).

In the third type of camera, an automatic film-transport mechanism is driven by means of an electric motor. Subsequent to each shutter release, the motor circuit is closed for film transport and then interrupted upon completion of transport. Such a system is very convenient to the camera user, who only needs to depress a shutter release button in order to take a picture. However, this system requires an external energy source usually supplied by batteries. In the event that batteries are not available, the camera is in fact inoperative. In the above three types of cameras, either the manual, the spring actuated, or the motorized types, the film-transport operation usually also functions to cock a shutter mechanism.

Moreover, the film cassettes as received from the manufacturer usually do not have the first frame properly positioned, the first frame being normally only half-way advanced to proper position for exposure. Thus, an initial half-frame film advancing operation is necessary by one means or another after cassette insertion. Although electric motor drive systems are known in the art for automatically actuating a film advancing operation upon closure of the film loading door after cassette insertion, the expense and complexity of electric motor drive systems, as well as their dependence on the state of the battery, all constitute detriments of one form or another. Thus, none of the above described film transport systems effectively reduces the number of operations necessary to advance the film without adding either extra steps or substantial system complexity and cost.

It would therefore be a useful contribution to the camera art to provide a simple, low cost film advancing system that would not require either a separate spring-tensing operation or electrically powered motors, and which would further have the capability of automatically positioning the first frame of the film properly upon cassette insertion without requiring extra operations by the user.

A fourth type of camera not currently being marketed satisfies some of these objectives. Such cameras provide a purely mechanical film advancement responsively to actuation of a single shutter release member (See U.S. Pat. No. 1,960,998 to Hindley et. al.). This patent discloses a roll film camera designed to be mounted on a barrel of a pistol, shutter actuation and film advance being secured by means of linkages to the trigger of the gun. The employment of disc film is not mentioned or suggested in this reference. The internal details of the Hindley camera are not shown; however, if one assumes that the film is to be dispensed from some form of rewind cassette, it is clear that film breakage can occur if the trigger is pulled at an end-of-film condition, since pulling the trigger not only actuates the shutter, but advances the film as well. To eliminate such breakage some form of slip clutch or other film advance disabling feature would be necessary to prevent this, thus adding to system complexity.

U.S. Pat. No. 2,625,087 (Steineck) describes a disc camera for a disc film cassette of a different type than that presently being marketed. This camera has a shutter operating member configured in the form of a lever, depression of the lever serving to cock and release the shutter and to rotate the film as well. A non-standard cassette is described, the cassette having a great variety of internal elements configured to interact with the shutter actuating system. The Steineck system, however, is quite complex. For example, it inserts a time delay between shutter tripping and film advance to prevent undue camera motion during exposure. Further aspects of this system will be discussed subsequently.

Thus, both of these patents disclose systems for securing film advance as well as shutter actuation automatically by actuation of a single operating member in a single squeezing or depressing motion.

Additionally, it would be a further contribution to the art if such a system could provide for a compatible system for insuring that the film, once advanced, is properly pressed against the framing shroud normally provided in such cameras, to ensure that the film is pressingly engaged against this generally planar element to position the film at the imaging plane of the lens. Such a system, however, must not be incompatible with the design objectives previously stated.

In addition to providing for a purely mechanical film advancing and shutter actuating system responsive to operation of a single member, there is a further need to provide for protection against breakage of the disc film should the user attempt to advance the cassette beyond the last frame. This problem arises because the commercially available cassettes have a built in locking mechanism that prevents the disc from further rotation beyond the last frame. As a result, it is necessary that any single-member actuated camera have provision for preventing actuation of the film advancing system after the last exposure has been made, so as not to apply a damaging torque to the film disc. Additionally, not only must the film advance be disabled, but shutter actuation must be disabled as well so as to prevent accidental double exposure of the last frame. Although automatic drive termination and shutter actuation systems are well known in the art in electrically driven cameras, merely requiring some form of end-of-film sensor actuated switch to shut down both systems, a simple purely mechanical realization of this feature would be highly desirable. Moreover, such a system should warn the user that further exposure is impossible without film replacement.

SUMMARY OF INVENTION

The subject matter of the invention is a purely mechanical shutter actuating and film advancing system for a disc camera using standard commercially available disc cassettes. Shutter cocking, shutter release, and film advance are all effected by actuation of a single member, that member in the preferred form being a mechanical pushbutton mounted on the top of the camera housing.

According to a feature of the invention the actuation member acts against a spring system, the spring system returning the member to an initial position upon release of operator pressure applied thereto. Film advance occurs only during the release phase, hence spring properties govern the force applied to the film during advance, so that at end-of-film, when the film can no longer be driven, film breakage from the source is eliminated. This simplification of the film advancing system is to be compared with the previously mentioned Steineck system, wherein, although film advancing is secured by actuating a shutter release member, film advance occurs by stored spring energy during depression of the release element shortly after the shutter trips. The film-advancing force is thus totally spring-governed; however, a mechanically complex delay system is necessary to insure that film advance is sufficiently delayed that it causes no camera movement during the shutter-open period. Such system complexities are avoided by the present invention.

According to a feature of the invention such a film advancing system incorporates a locking system which prevents depression of the shutter button after the last exposure, thereby preventing not only accidental double exposure of the last frame, but also preventing further actuation of the film advance mechanism. According to a preferred form of the invention, film advance is secured by a reciprocating pawl engaging the peripheral notches of the disc film, the pawl extending into the exposure window region of the cassette to engage the peripheral film notches sequentially as described in U.S. Pat. No. 4,449,806, issued May 22, 1984. According to a specific feature of the invention, means are provided within the camera to lift the pawl to a completely disengaged position during the retraction stroke of the pawl, which feature is not disclosed in this prior application.

According to a further feature of the invention, a pressure member is mechanically coupled to the shutter actuating member, e.g. the pushbutton previously mentioned, to apply pressure to the flexible region of the cassette in the imaging area thereof so as to press the film disc against a shroud extending rearwardly from the rear wall of the camera into the cassette window to provide film flattening. Pressure is applied only during that portion of the cycle of the actuating member which occurs after film advance has been carried out.

According to a further feature of the invention, provision is made to decelerate the film advancing system during a portion of the terminal phase of the advancing cycle so as to prevent accidental over-advancement of the film. A specific feature of the invention, used in the preferred embodiment, provides for film advance through actuation of a claw-mounted pawl engaging peripheral notches of the film and moving responsively to movement of the actuation member, deceleration of the film advance during the terminal phase thereof being secured by coupling additional mass to the claw during the terminal portion of the film advancing stroke, thereby substantially reducing the speed of film advance at this time.

According to a further feature of the invention, a mechanical coupling responsive to operation of the loading door system attendant to insertion of a fresh film cassette causes the film disc to be rotated to a proper initial imaging position by the time that the door has been closed and latched. According to a specific feature of the invention, and as disclosed in the preferred embodiment, this film advance is carried out by providing a cocking mechanism which actuates the film advance claw to a tensioned cocked retracted position responsive to actuating a loading door latch to an open position, closure of the door and actuating the latch to the terminal position of its closure motion then releasing the claw be driven by an operating spring associated therewith to engage the film and advance it into proper orientation for the first exposure.

Thus, shutter and film advancing operations are provided by direct mechanical drive from the shutter button, the drive system further providing for automatic film flattening during shutter release, a double exposure prevention system after the last frame has been exposed, and automatic initial film framing advance after cassette insertion.

Other advantages and features of the invention will become apparent upon making reference to the description to follow, the drawings, and the claims.

DESCRIPTION OF DRAWINGS

FIGS. 3A–3E are plan views of a disc camera a film-transport mechanism in the state when the camera is at rest ready for the next exposure (FIG. 3A), when the shutter release button is depressed mid-way (FIG. 3B), when the shutter release button is fully depressed (FIG. 3C), when the shutter release button is returned midway and the film is being transported (FIG. 3D), and when the shutter release button is returned to the rest position but the film is only partially transported (FIG. 3E).

FIGS. 4A–4D are plan views of a shutter mechanism cooperating with the transport mechanism and shown in the state when the camera is at rest ready for the next exposure (FIG. 4A), when the shutter release button is depressed mid-way (FIG. 4B), when the shutter release button is fully depressed and the shutter is being released (FIG. 4C), and when the shutter release button is returned mid-way and the shutter is being recocked (FIG. 4D).

FIG. 5A is a plan view of a disc film in relation to a film advancing claw and the components for guidance of the claw motion.

FIGS. 5B–5E are side cross-section views of the elements of FIG. 5A showing the disc film in relation to the claw and the components for guidance of the claw motion in the state when the camera is at rest ready for the next exposure (FIG. 5B), when the claw is mid-way in a preparation stroke (FIG. 5C), when the claw is at end of the preparation stroke and the shutter is being released (FIG. 5D), and when the claw is transporting the film (FIG. 5E).

FIGS. 6A–6E are plan views of elements of the film-transport mechanism and a film-chamber door latching mechanisms in the state when the door is latched closed (FIG. 6A), when a latching lever is just starting the unlatching operation (FIG. 6B), when the unlatching operation is mid-way (FIG. 6C), when the film-chamber door is fully unlatched (FIG. 6D), when the film-chamber door is being latched closed (FIG. 6E).

FIG. 8A is a plan view of elements of a cassette back-pressure mechanism; and

FIGS. 8B–8D are side elevational views of the back-pressure mechanism of FIG. 8A when the film is being pressed against the imaging plane (FIGS. 8B and 8C), and when the back pressure is relieved (FIG. 8D).

DESCRIPTION OF THE INVENTION

The invention described herein is a film advancing system for disc film cameras. The system provides for film advance, shutter cocking, shutter release, and selective application of film-flattening pressure, all mechanisms deriving their motive power directly from operation of the shutter release button. A cooperating feature provides initial half-frame advance of the first frame after cassette insertion. Automatic double-exposure prevention is also provided.

Figure 1:
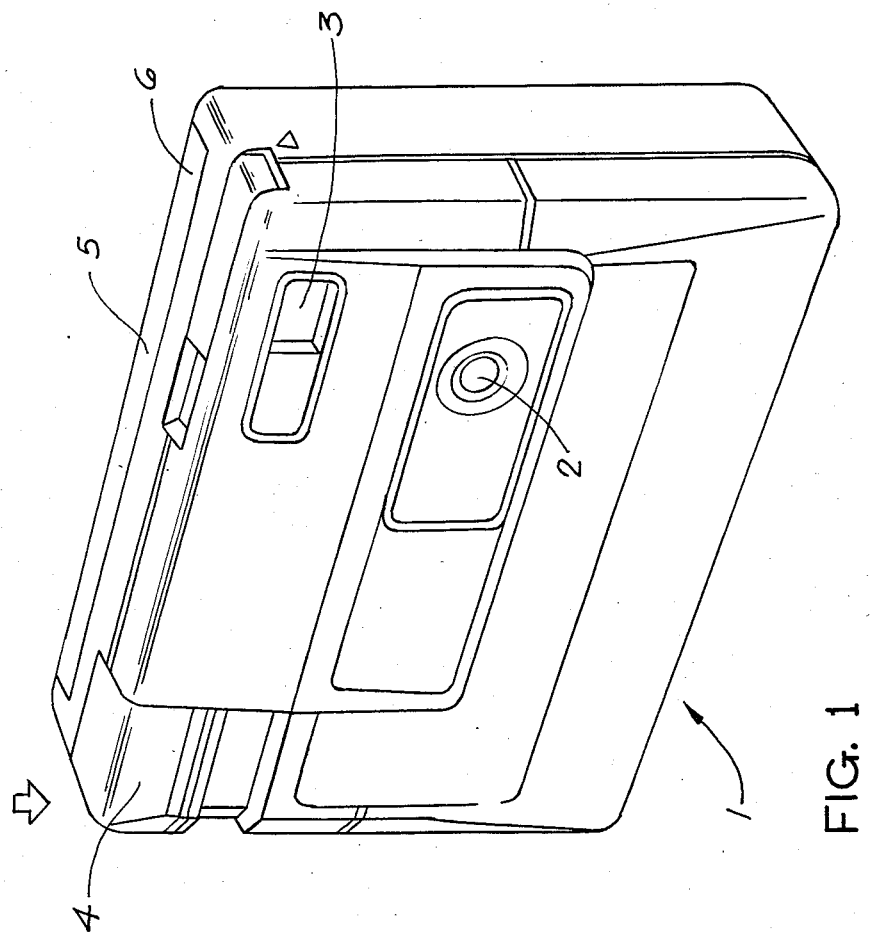
FIG. 1 is a front perspective view of a disc camera.
Figure 2:
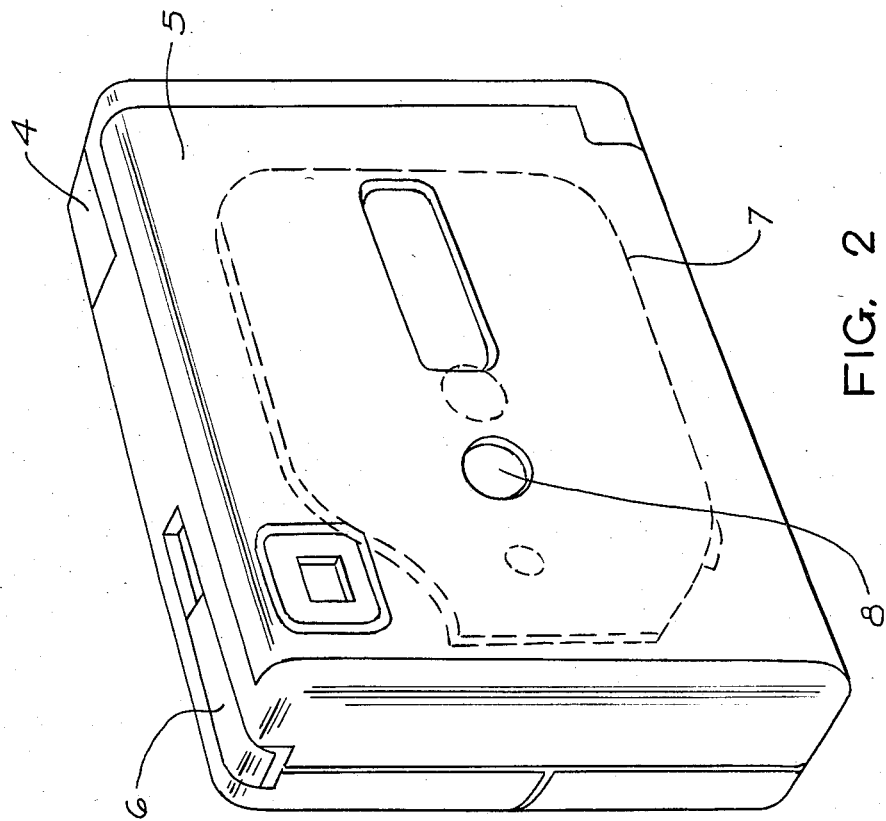
FIG. 2 is a rear perspective view of a disc camera showing a loaded disc film cartridge in dotted outline.

By way of general overview, FIG. 1 shows a view of a disc camera 1 of the present invention which contains a picture-taking lens 2 disposed near the right-hand edge of the camera, a viewfinder objective 3 in the top right-hand corner, and a shutter release button 4 in the top left-hand corner. The depression of the shutter release button 4 is downward as shown by an arrow in FIG. 1. On the back of the camera 1 (FIG. 2) is a film-chamber door 5. The numeral 6 indicates a latching lever which is manually operable by the camera user to latch closed or unlatch open the film-chamber door 5. FIG. 2 also shows in dotted outlines a disc film cartridge 7 which has been loaded into the film chamber. The window 8 allows the camera user to observe the number of the fresh exposure frame which has just been transported into the imaging position and ready for exposure.

FIGS. 3A through 3E show a film-transport mechanism for the camera 1 in various states during the depression and return of the shutter release button 4. The camera 1 is generally divided into two chambers by means of a partition wall 1a. On one side of the wall 1a is the film chamber, and on the other side the film-transport mechanism is built onto the wall 1a.

The shutter release button 4 is a part of a shutter release slide 9 which is guided to move in either the downward or the upward return directions by means of a slot 10 of the slide 9 in engagement with a circular boss 11 integral with the partition wall 1a. The shutter release slide 9 is also guided on the sides by some ribs integral with the wall 1a, but details are not shown in the figures. The ends of the slot 10 act as limiting stops to the downward or upward motions of the shutter release slide 9. On the bottom end of the shutter release slide 9 is a circular boss 12 which is in engagement with a slot 14 of a pressure-plate control lever 13 pivoted on a pin 15 integral with the wall 1a. The pressure-plate control lever 13 has a control arm 16 which, during depression and return of the shutter release button 4, actuates a mechanism exerts or relieves the pressure applied to the disc film. The detailed function of the control lever 13 will be described later.

The shutter release slide 9 has an extension part 17 which contains a rack 18, a recess 19 and a step 20. The function of the recess 19 and the step 20 will be described later. The rack 18 is in meshing engagment with a gear part 22 of a central gear 21, which is rotatable about a centre axle 23. Right on top of the central gear 21 is a film claw 26. Beneath the central gear 21 is another component which functions during latching and unlatching of the film-chamber door 5 which is however not shown in FIGS. 3A–3E for the sake of clarity, but is shown in FIGS. 6A–6E. Its function will be described later. This latter component, together with the central gear 21 and the film claw 26, are held in a stack. Each is freely rotatable about center axle 23 by means of a circular plate 24 fastened to the centre axle 23 with a screw 25. The film claw 26 has a claw tip 27 protruding through an arcuate slot 28 of the partition wall 1a into the film chamber. The reciprocating strokes of the tip 27 serve to transport the film, as will be described later. The film claw 26 also has a hook part 29 which attaches to a spring 30. The other end of the spring 30 is hooked to a pin 31 integral with the wall 1a.

Figure 3A:
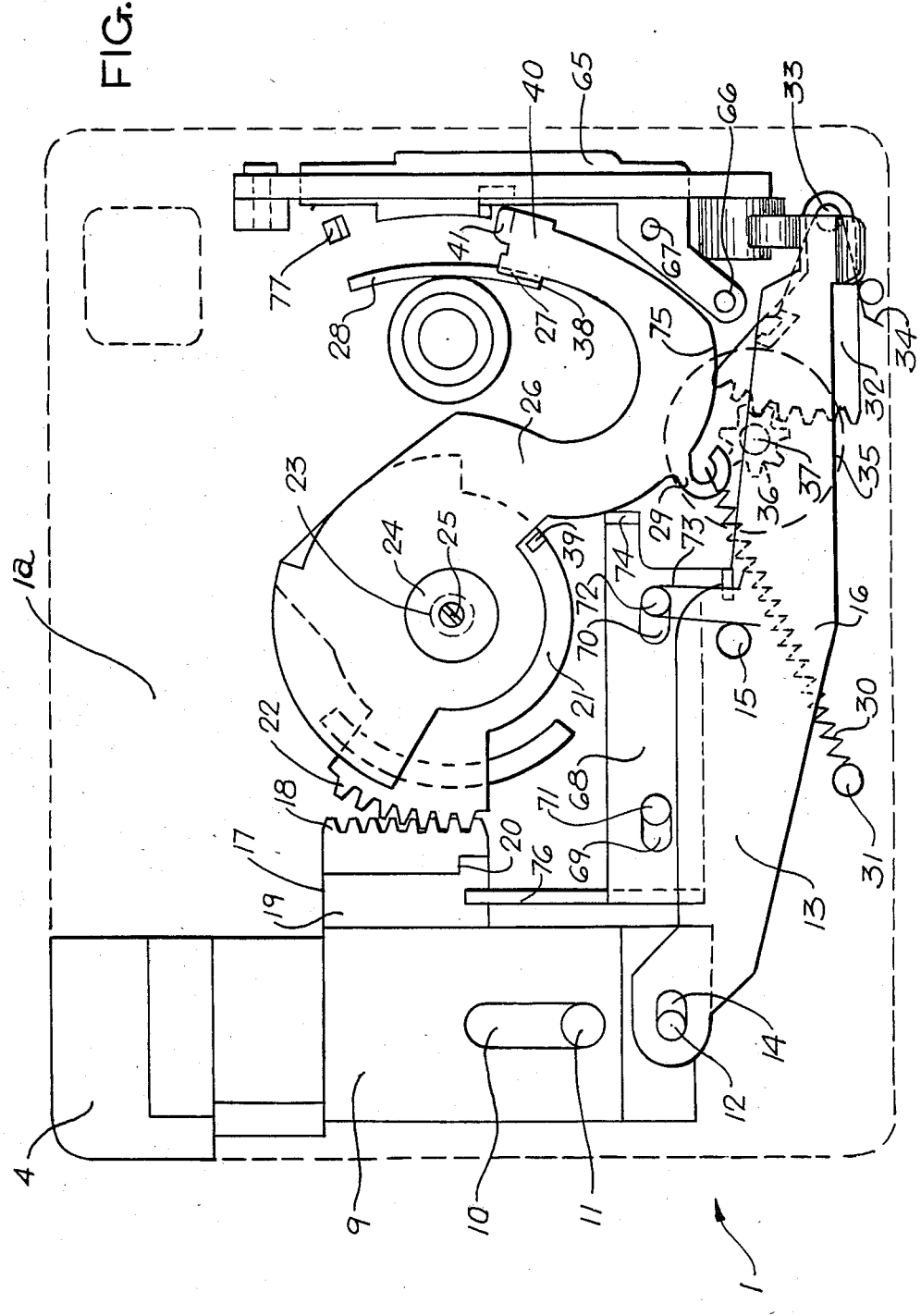

Because of the loading of the spring 30, the film claw 26 is always biased in the clockwise direction and, in the rest state of the camera as shown in FIG. 3A, a straight edge of the claw tip 27 presses against an end edge 38 of the arcuate slot 28. With this position of the claw tip 27, the film disc is positioned such that one fresh exposure frame is exactly in the imaging position because of a claw-tip/film-notch engagement (to be desribed later).

FIG. 3A also shows an arcuate edge 75 of the film claw 26 pressing against a sector gear 32 which is pivoted on a pin 33 integral with the wall 1a, the claw being biased by a light torsion spring 34. The sector gear 32 is in meshing engagment with a gear part 36 of an inertial mass 35, the latter being freely rotatable about an axle 37 also integral with the wall 1a. When the film claw 26 is operated to positions away from that of the rest state shown in FIG. 3A, such as in the positions shown in FIGS. 3B–3E, the sector gear 32 is urged by the spring 34 to rotate so as to bring the inertial mass 35 into rotation. The gearing ratio of the sector gear 32 to the gear part 36 is made large such that the effective inertia of the mass 35 is substantially increased, i.e. by the square of the gearing ratio. The coupling of the sector gear 32 and the inertial mass 35 forms a speed-decelerating device whose function will be described later.

The central gear 21 also has a lug part 39 such that, if the gear 21 is operated to rotate anti-clockwise during the depression of the shutter release button 4, it will urge the film claw 26 to rotate anti-clockwisely against the tension of the spring 30. The film claw 26 also has a guiding part 40 and a leading part 41. These two latter parts work in cooperation with a claw guide 65 and a lug part 7 integral with the wall 1a during the reciprocating strokes of the claw 26. Details of this action will be described later. The claw guide 65 is fastened to the partition wall 1a by means of a screw 66, and is located in position by pin 67 (also integral with the wall 1a). Because the material used for the claw guide 65 is resilient, the claw guide 65 serves also as a cantilever spring. FIGS. 9A–9D show various views of the claw guide 65.

FIGS. 3A–3E further show a double exposure prevention (subsequently termed DEP) slide 68 which has slots 69 and 70 in engagement with circular bosses 71 and 72 integral with the wall 1a. Thus the DEP slide 68 is translational along the slotsm 69. The DEP slide 68 is biased by means of a light torsion spring 73, but the slide 68 is held in the position shown in FIG. 3A because the arcuate edge 75 of the film claw 26 is pressing against a lug part 74 of the slide 68. The DEP slide 69 also has an extension part 76 which functions to inhibit double exposure after the fifteenth exposure of the disc film has been taken.

The functioning of the systems of the camera will now be discussed in detail. FIGS. 4A–4D show the shutter mechanism of the camera 1 in various states during the depression and return of the shutter release button 4. The whole shutter mechanism is built on a shutter baseplate 42 which is fastened to the partition wall 1a by means of screws 42a, 42b and 42c and which is immediately above the film-transport mechanism. In FIGS. 4A–4D, details of the film-transport mechanism underneath the baseplate 42 have been deleted for the sake of clarity.

FIG. 4A shows a shutter striker 43 held in the cocked position by means of a release lever 46 because of the engagement of the cocking parts 45 and of the two components respectively. The shutter striker 43 is mounted on the shutter baseplate 42 by means of the rivets 44. The release lever 46 is pivoted on a rivet 47, and is biased by means of a light torsion spring 48. The release lever 46 also has a release arm 50 which extends into a cut-out chamber 52 in the back of the shutter release slide 9. The chamber 52 has a face 53 which acts on the release arm 50 when the shutter release button is depressed to travel downwards. The release lever 46 is spring-held in the position shown in FIG. 4A because of the abutment of the release arm 50 with a stopper pin 51 integral with the partition wall 1a. The shutter striker 43 also has a striking part 54 which strikes against a shutter blade 55 when the former is released. The shutter striker 43 is itself made of a thin spring metal such that is is in fact in a stressed state as shown in FIG. 4A, and the stored energy is utilized to kick open the shutter. The shutter blade 55 is pivoted on a rivet 78 and is biased by a light torsion spring 57. A shutter hole 56 is covered as shown in FIG. 4A when the shutter blade 55 is in abutment with a stopper pin 58.

FIG. 4A also shows a cocking lever 59, pivoted on a rivet 60, and biased by a very strong torsion spring 61. One end of the spring 61 is held by means of a hook 62 of the shutter release slide 9. The cocking part 63 of the cocking lever 64 acts on the cocking part 45 of the shutter striker 43 to urge the latter to a cocked state.

The various operations of the film-transport and shutter mechanisms during the depression and return of the shutter release button 4 will next be described. When the shutter release button 4 is depressed mid-way as shown in both FIGS. 3B and 4B, the cocking lever 59 is first actuated to rotate anti-clockwise against the spring 61 and the cocking part 63 moves away from the cocking part 45 of the shutter striker 43. However, the rest of the shutter mechanism remains in the cocked state because the cocking parts 45 and 49 are still in engagement. Referring to FIG. 3B, the central gear 21 rotated anti-clockwise because of the meshing gear parts 18 and 22. The film claw 26 is in turn rotated anti-clockwise against the tension of the spring 30 because of the actuation by the lug part 39 on the central gear 21. The claw tip 27 thus travels in its preparation stroke along the slot 28. The guiding part 40 and the leading part 41 ride over the claw guide 65. The detailed arrangment of the claw in relation with the disc film, the partition wall 1a, and the claw guide 65 is illustrated in FIGS. 5A–5E.

FIG. 5A shows a view of the emulsion side of a disc film 80 as related to the film transport mechanism. The film claw 26 has its claw tip 27 in engagment with a pheripheral notch 81 of the disc film 80. The claw guide 65 and the lug part 77 are also shown. Other components are removed from the figure for the sake of clarity. The current fresh exposure frame 82 is in position ready for exposure. The next exposure frame 83 will be brought into the imaging position by means of the engagement of the claw tip 27 with a notch 84 during the next film-transport operation. FIG. 5A shows these components in the rest state of the camera 1 ready for the next picture-taking operation. FIG. 5B depicts the same rest state as seen when looking from the right of FIG. 5A. FIGS. 5C–5E are similar side views in sequential states during the depression and return of the shutter release button 4. FIGS. 5B–5E also show portions of the claw guide 65 as having a forward-sloped leading part 85 and an inward-sloped trailing part 86, and part of a claw retainer 87. The claw retainer 87 is mounted by the same screw 66 and the same pin 67 by which the claw guide 65 is mounted. It is deleted in FIG. 5A for clarity. Furthermore, the claw retainer 87, made of thin spring metal, always presses either on the leading part 41 of the film claw 26 or on the claw guide 65. As a result, the film claw 26 is retained as close to the partition wall 1a as possible during the preparation and return strokes. The claw retainer 87 is not shown in FIGS. 3A–3E and 4A–4D so that the functions of the claw guide 65 and of the lug part 77 can be more easily understood.

Figure 4B:
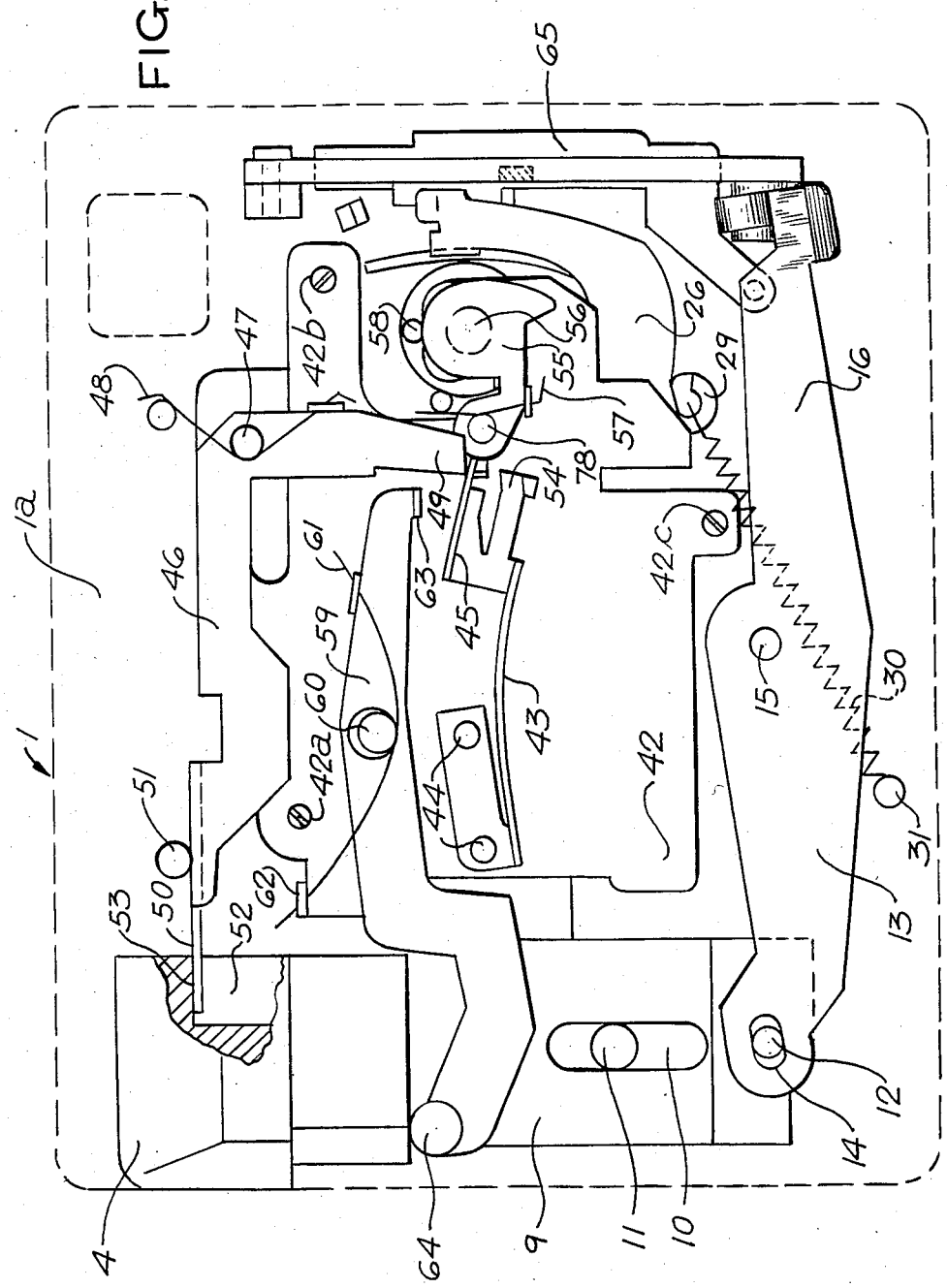

When the shutter release button 4 is depressed midway and the film-transport and shutter mechanisms are as shown in FIGS. 3B and 4B respectively, the guide part 40 of the film claw 26 rides on top of the claw guide 65 as shown in FIG. 5C. The cooperating slopings of both the leading part 41 of the film claw 26 and the leading part 85 of the claw guide 65 cause the guide part 40 go atop the claw guide 65. As can be seen from FIG. 5C, the claw tip 27 is lifted from the emulsion surface of the disc film 80. Therefore, during the preparation stroke of the film claw 26 no frictional force is applied to the disc film by the claw tip 27. If such provision were not made the disc film might be forced to rotate, causing the current exposure frame 82 to move away from the proper framing position.

Figure 4C:
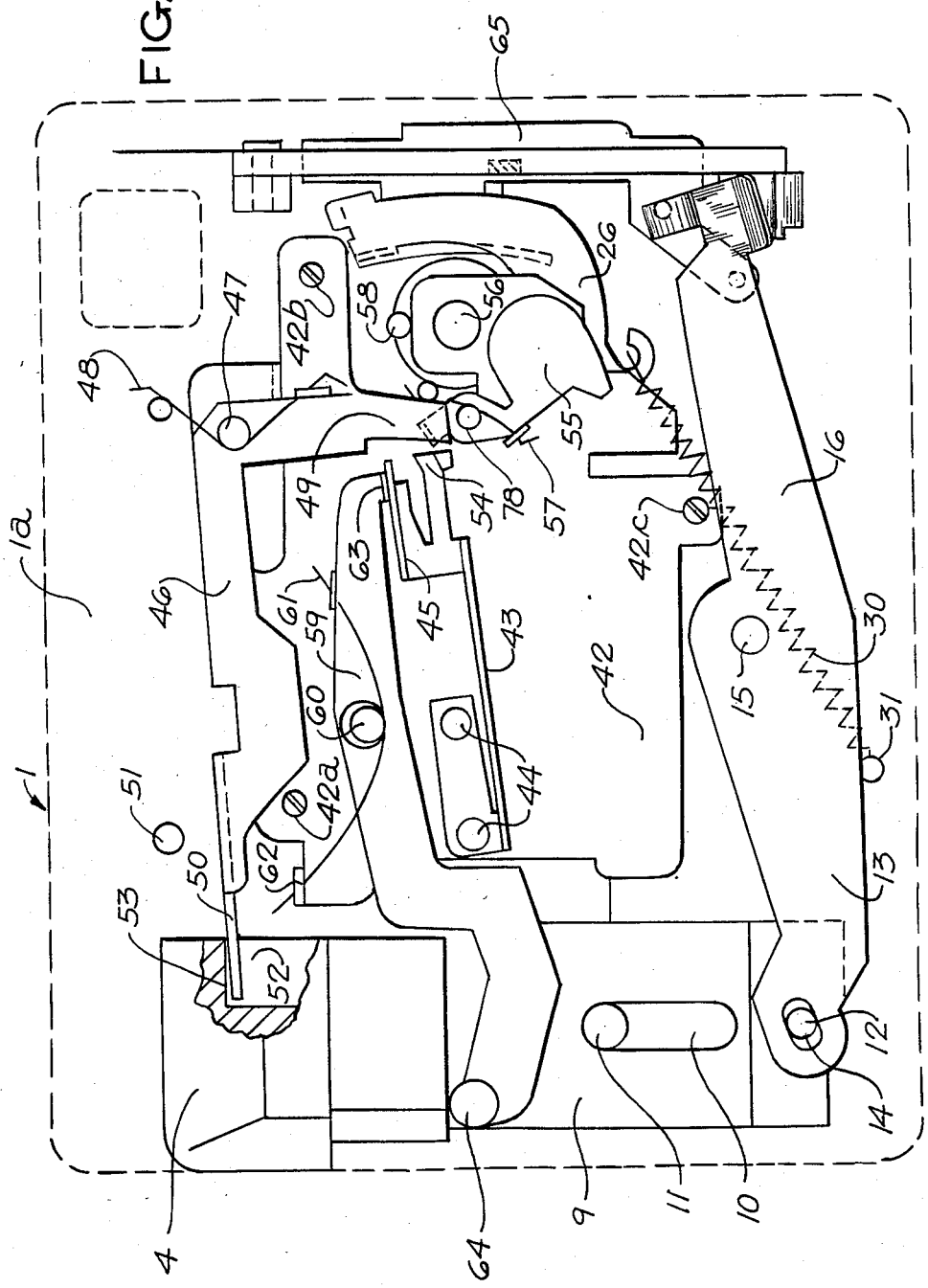

Further depression of the shutter release button 4 causes the face 53 to act on the release arm 50 of the release lever 46 (FIG. 4B). The latter is rotated anticlockwise. Finally, at the end of the depression, the cocking parts 45 and 49 disengage and the pre-stressed shutter striker 43 is released so that the striking part 54 kicks against the shutter blade 55. The shutter blade 5 is thus flipped to uncover the shutter hole 56. This state is shown in FIG. 4C. The shutter blade 55 then returns to re-cover the shutter hole 56 under the action of the biasing spring 57.

Figure 3C:
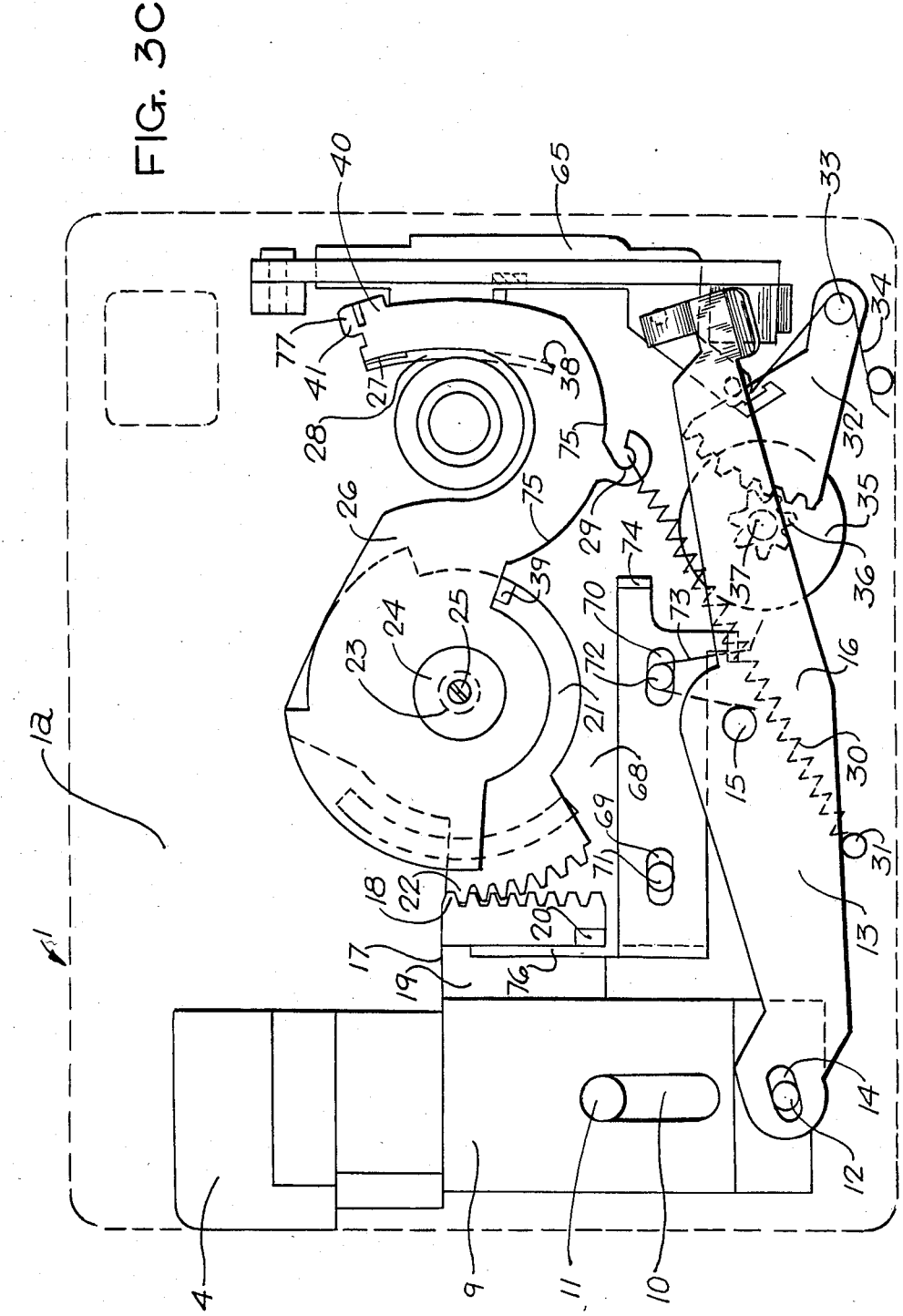

At the same time that the shutter is released, the film-transport mechanism is in the state as shown in FIG. 3C, i.e. the film claw 26 is at the end of its preparation stroke such that the guide part 40 is riding on top of the lug part 77 of the partition wall 1a, as shown in FIG. 5D. The leading slope of the lug part 77 helps the guide part 40 ride over the lug part 77. At this same time the claw tip 27 is still held away from the disc film 80. Therefore, the film claw 26 and its claw tip 27, which could still be moving incrementally, cannot move the disc film 80. Were such provisions not made, the current exposure frame 82 might be moved away from the proper framing position.

Figure 3D:
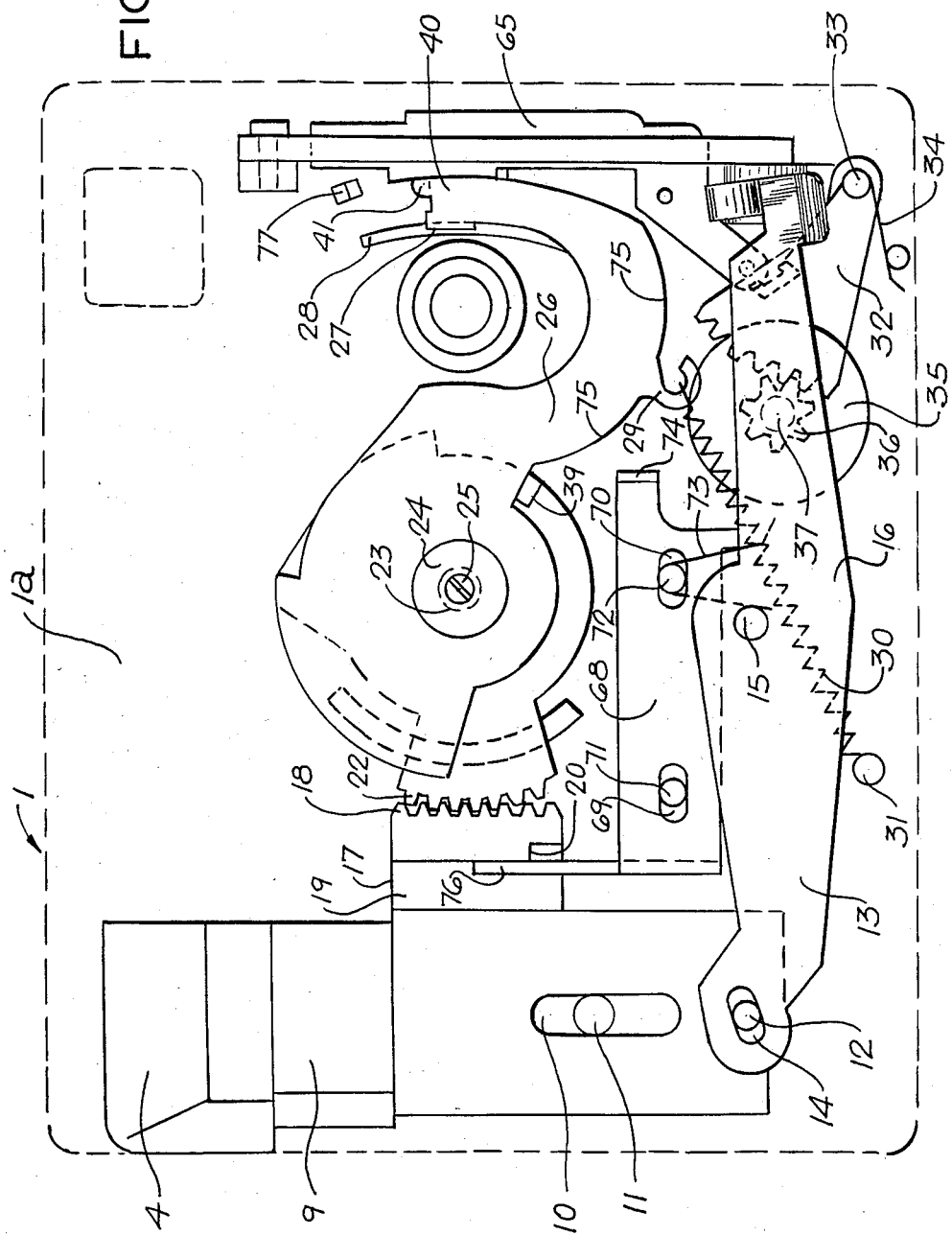

After the exposure is made, the shutter release button 4 is released to return upwardly. FIGS. 3D and 4D show the film-transport and shutter mechanisms respectively in the state when the shutter release button 4 has returned mid-way. The return of the shutter release button 4 is actuated by the strong torsion spring 61 causing the roller pin 64 to exert upward force on the face 79 of the shutter release slide 9. At the same time, the cocking part 63 of the cocking lever 59 acts on the cocking part 45 of the shutter striker 43. The latter component is thus stressed, and the release lever 46 starts to return to its rest position under the action of the biasing spring 48. The shutter is now being re-cocked.

As shown in FIG. 3D, the film claw 26 is mid-way in its clockwise return film-transport stroke actuated by the tension of the spring 30. Also, as shown in FIG. 5E, because of the inward sloping of the trailing part 86 of the claw guide 65 and secondly because of the pressure by the claw retainer 87, the guide part 40 and the leading part 41 of the film claw 26 pass under the claw guide 65. The claw tip 27 eventually engages with the pheripheral film notch 84, and the disc film 80 is brought to rotate clockwise. The previously exposed frame 82 is moving away and the next frame 83 is moving into the imaging position.

Finally when the shutter release button 4 returns to its uppermost position, everything is returned to its original state, i.e. the rest state of the camera 1 as shown in FIGS. 3A, 4A, 5A and 5B. The shutter is re-cocked and the claw tip 27 is in abutment with the end edge 38 of the arcuate slot 28. The next exposure frame 83 is in proper imaging position.

However, before the shutter release button 4 has risen to its uppermost position, and before the new frame 83 has gone completely into imaging position, the arcuate edge 75 of the film claw presses onto the sector gear 32 and brings the latter to rotate against its light loading by spring 34. The inertial mass 35 is also brought into rotation. A large inertial mass is thus added to the rotating film claw 26 such that the rotation speed of the film claw 26 and also of the disc film 80 is thus greatly decelerated. Therefore, the last part of the film-transport operation is completed in a low speed, and overtravel of the disc film is avoided. Overtravel would be unavoidable without the speed-decelerating device (sector gear 32 in coupling with the inertial mass 35) if the shutter release button 4 is accidentally quickly released by the camera user to spring upward at its maximum travel rate.

Thus, film advancing and shutter recocking are carried out by a single shutter button actuation cycle, with a selectively interposed inertial deceleration providing a more precisely defined limit to the film advance. As mentioned in the Summary of Invention with reference to the Steineck system, film advance by stored spring energy derived from the shutter actuating member is known in the art; however, by using the stored energy in the spring 30 during release of the shutter release button 4 well after shutter release, the complexity of the Steineck system is largely eliminated.

Figure 3E:
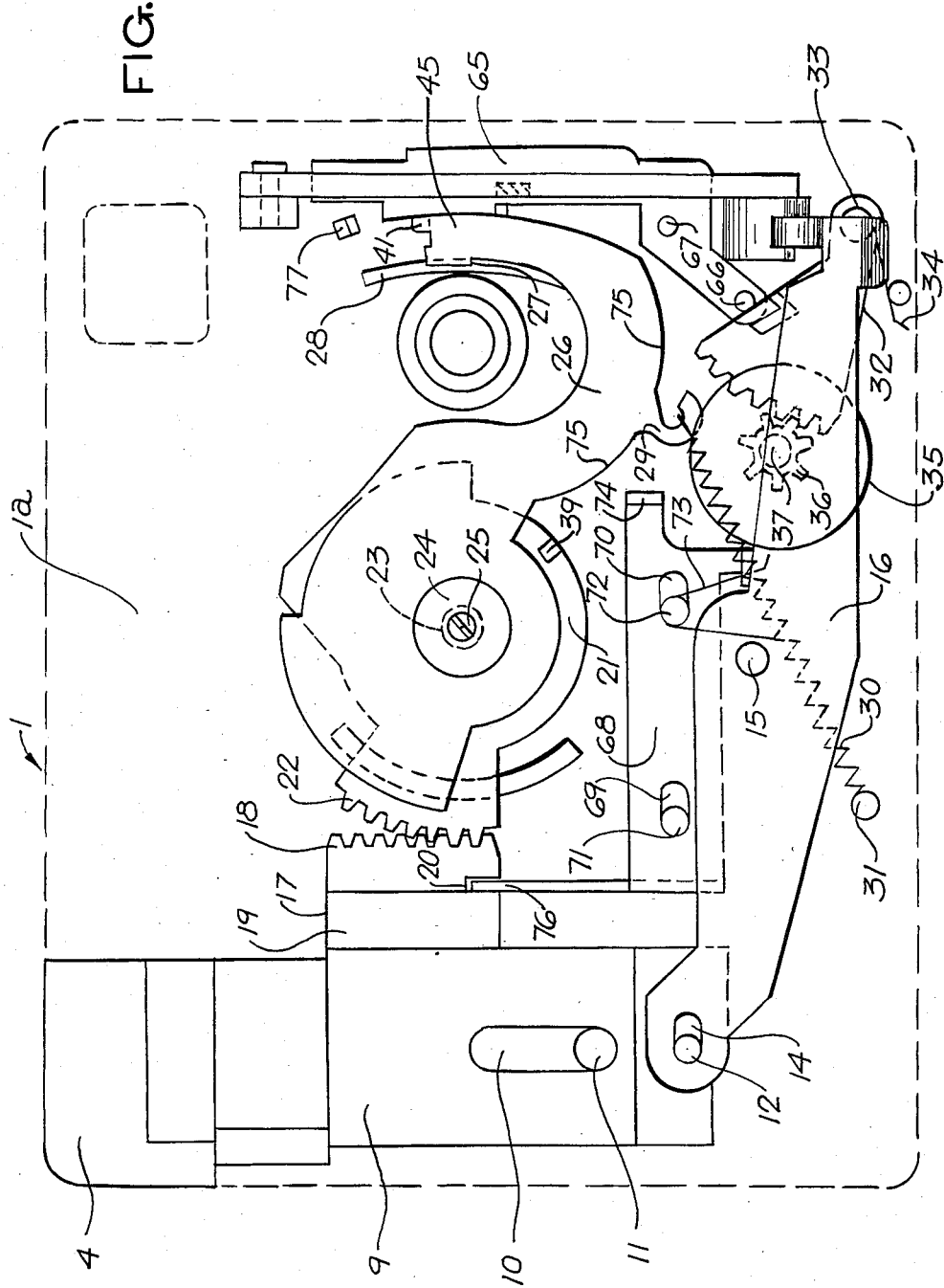

Provision is also made to prevent shutter actuation after the fifteenth frame has been exposed. In each transport of the fifteen exposure frames of the disc film into the imaging position, the film claw 26 returns to the same position having the claw tip 27 pressing aginst the end edge 38 of the arcuate slot 28. However, provision is made so that after the fifteenth exposure is taken the complete return of the shutter release button 4 results in only partial advance of the film claw 26. This occurs because further rotation of film is inhibited internally by an end-of-film stop manufactured into the disc film cartridge so that the first exposure frame cannot again be brought again into the imaging position. Thus, the film-transport mechanism is in the state as shown in FIG. 3E. When the shutter release button 4 has returned completely and the shutter is re-cocked after the fifteenth frame, depression of the button must be prevented, otherwise double exposure to part of the fifteenth exposure frame and part of the first frame would occur.

Double exposure prevention after the fifteenth exposure is facilitated by means of the double exposure prevention slide 68. Since the film claw 26 is halted midway, its arcuate edge 75 does not press against the bent end 74 of the DEP slide 68. The spring 73 thus causes the slide 68 to move to its rightmost position moving the extension part 76 (extending into the recess 19) under the step 20 of the shutter release slide 9. Depression of the shutter release button 4 is thus inhibited. On the other hand, before exposure of the fifteenth frame full depression of the shutter release button 4 can be accomplished. Although the film claw 26 is retracted away from engagement with the bent end 74, the rightward motion of the slide 68 is prevented by the engagement of the extension part 76 with a side wall of the recess 19. The extension part 76 thus cannot go into the step 20, and depression of the shutter release button 4 is permitted.

The foregoing paragraphs have described a fully automatic and solely mechanical film-transport mechanism for a disc camera. One single operation (other than exposure or focusing adjustments) by the camera user is sufficient to take a picture, i.e. actuation of a shutter release button. The self-return stroke of the shutter release button results in both film transport and re-cocking of the shutter. No external energy source, such as from electrical batteries, is required for the film-transport and shutter-cocking operations, and double exposure is prevented. Precision of film advance is augmented by selectively coupling a terminal inertial deceleration to the film advancing system.

Further utilizing the advantages of an automatic film-transport mechanism based on the principle of the claw-and-notch engagement, the present invention further comprises a film-chamber door latching mechanism which also functions to transport the first exposure frame of the disc film 80 into proper framing position.

Such an initial advance is necessary, since the disc film cassettes as manufactured place the first frame in a half-advanced position. The transport is achieved by moving the claw 26 to a spring-loaded cocked retracted position responsively to extending the loading door latch arm 6, and then releasing the claw to travel through an advancing stroke upon latch closure.

In more detail, FIGS. 6A–6E show the film-transport and film-chamber door latching mechanisms in various stages during the opening and closing of the film-chamber door 5. FIG. 7 shows a section through the film-transport mechanism showing the general placement of the related components. Other components are deleted for the sake of clarity. Underneath the central gear 21 is a dark-slide lever 88 which is also rotatable about the centre axle 23. The film claw 26, the central gear 21 and the dark-slide lever 88 are held in a stack by means of the holding plate 24 fastened to the centre axle 23 by the screw 25. In FIGS. 6A–6E, the central gear is only partially shown for the sake of clarity. The dark-slide lever 88 has lug parts 89 and 90, a gear part 91 and a releasing part 92. When the dark-slide lever is operated to rotate anti-clockwise, the lug part 89 actuates on the film claw 26, and the latter is brought to rotate also anti-clockwise. The lug part 90 of the dark-slide lever protrudes through an arcuate slot 93 in the partition wall 1a into the film chamber. The lug part 90 engages in a customary manner (not shown) with the slot of the dark slide of the disc film cartridge, and functions to close or open the dark slide when the film-chamber door 5 is unlatched or latched respectively. The gear part 91 of the dark-slide lever 88 is in mesh with a transmission gear 94 which is freely rotatable about a pivot pin 94 integral with the wall 1a. The transmission gear 94 is in turn in mesh with a sector gear part 96 of the latching lever 6. The latching lever 6 is pivoted on a pin 97 also integral with the wall 1a. The latching lever 6 further contains a boss 98 carried at the end of a resilient arm 99. The partition wall 1a has two small detent recesses (not shown in the figures), such that the boss 98 falls into either recess when the latching lever is in either the closed or open position.

FIGS. 6A–6E also show a claw-arresting lever 100 which is pivoted on a pin 101 integral with the wall 1a, and which is always biased anti-clockwise by a torsion spring 102. The free end of the torsion spring 102 is held by a pin 103 integral with the wall 1a. A cocking part 104 of the claw-arresting lever 100 presses against a circular rim 105 of the film claw 26. At one end of the circular rim 105 is a step 106 so configured that the rim of the film claw 26 beyond the step 106 is nearer to the claw center axis than the circular rim 105.

Figure 6C:
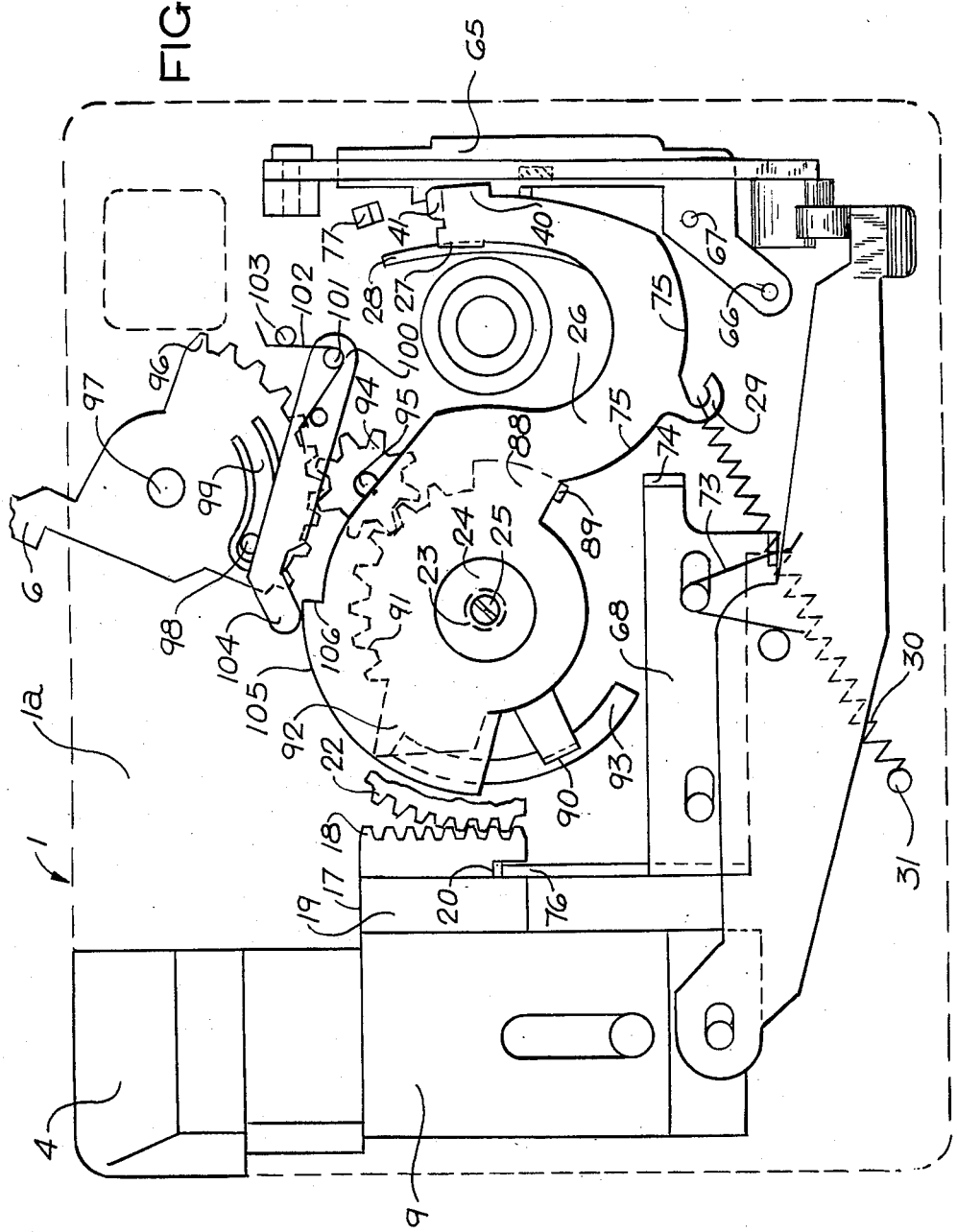
Figure 7:
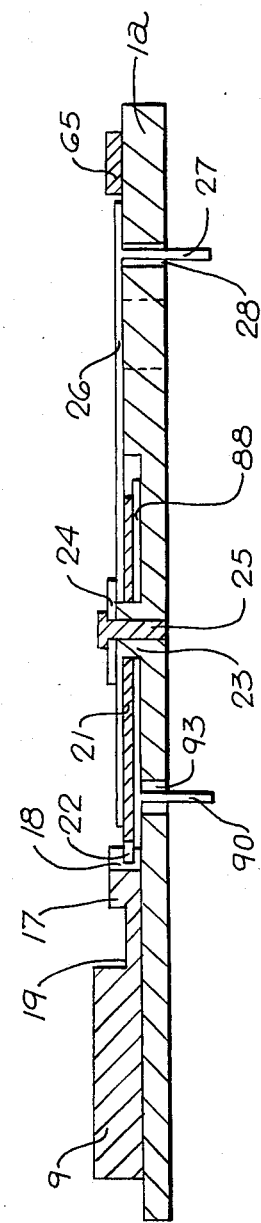
FIG. 7 is a cutaway cross section view of the film-transport mechanism showing in particular the vertical placement of the components.
Figure 9D:
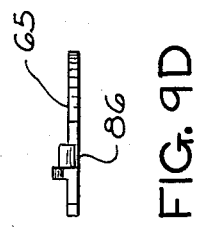
FIGS. 9A–9D are various views of a claw guide used to life the claw during the preparation (retraction) stroke.
Figure 9A:
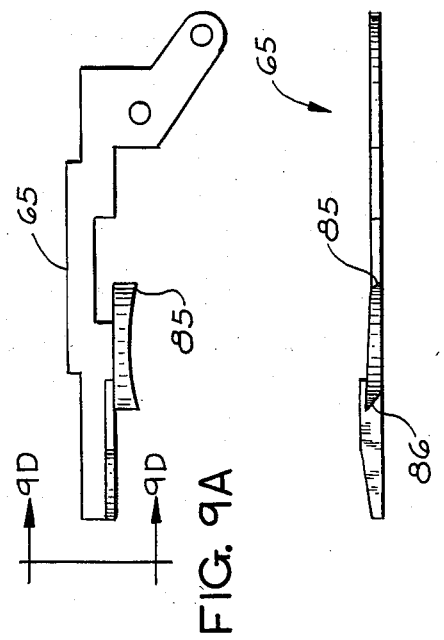
Figure 9B:
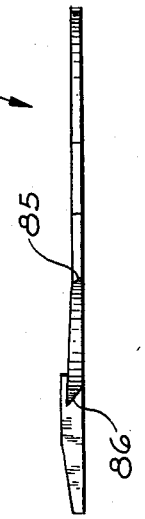
Figure 9C:
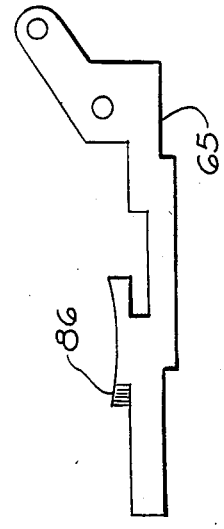

FIG. 6A shows the latching lever 6 in the closed position. The dark slide (not shown) of the disc film cartridge is fully open for the purpose of picture taking. The lug part 90 is in engagement with the slot of the dark slide. FIG. 6B shows the latching lever 6 positioned mid-way to unlatch the film-chamber door 5. The dark-slide lever 88 is operated also mid-way such that the dark slide of the disc film cartridge is partially closed. The lug part 89 has just come to the point that is just starts to act on the film claw 26. Further anti-clockwise rotation of the latching lever 6, as shown in FIG. 6C, results in the anti-clockwise rotation of the film claw 26 in a similar manner as described previously when the shutter release button 4 is depressed. The double exposure prevention slide 68 travels to the right such that the extension part 76 goes under the step 20 of the shutter release slide 9. Therefore, the depression of the shutter release button 4 is inhibited during the latching and unlatching operations until the film claw 26 is returned.

Figure 6D:
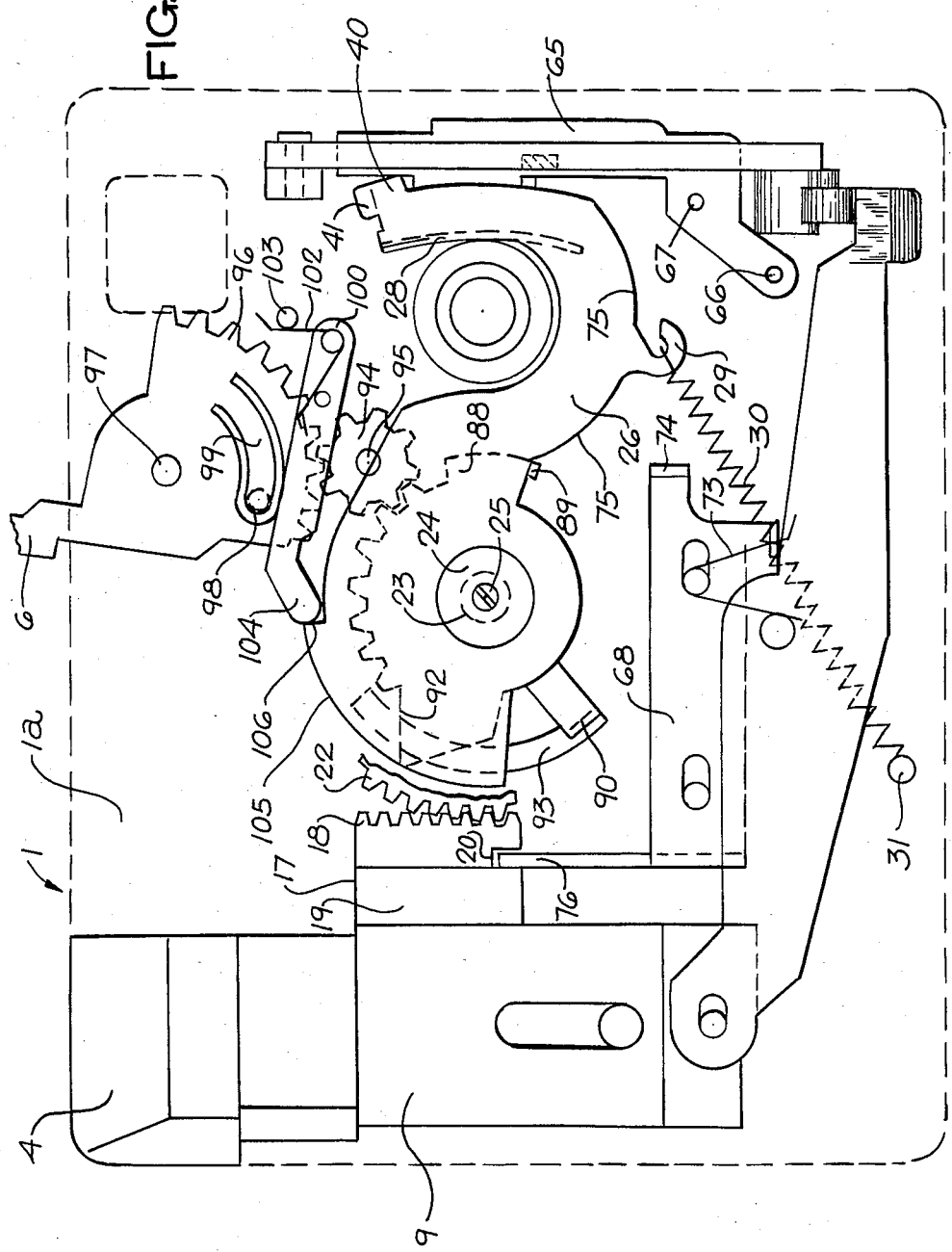

As the latching lever 6 is further moved to be fully unlatched as shown in FIG. 6D, first the dark slide is fully closed, second the film claw 26 is actuated to its most anti-clockwise position, and third the cocking part 104 of the claw-arresting lever 100 drops into the step 106 on the rim of the film claw 26. As a result, the return clockwise rotation of the film claw 26 will be inhibited even though the engagement by the lug part 89 is later released. The exposed disc film cartridge is then ready for unloading.

After a new disc film cartridge 7 is put into the film chamber, the latching lever 6 is operated by the user to latch the film-chamber door 5 closed. First, the dark slide of the new disc film cartridge 7 is opened. Second, the dark-slide lever 88 is operated to rotate clockwise such that the lug part 89 moves away from the film claw 26. However, the film claw 26 does not return under the tension of the spring 30 because it is arrested by the engagement between the cocking part 104 and the step 106. This is shown in FIG. 6E. When the latching is almost complete and the dark slide is almost closed, the releasing part 92 of the dark-slide lever 88 acts on the cocking part 104 of the claw-arresting lever 100. The latter is eventually forced to rotate clockwise, and finally the cocking part 104 moves away from the step 106 so that the film claw 26 is released to return in a similar manner as described previously whenever the shutter release button 4 is released to return after a depression. The claw tip 27 comes into engagement with the pheripheral notch corresponding to the first exposure frame of the disc film 80. As a result, the first exposure frame is brought into proper framing position. The film-chamber door latching mechanism returns to the original state as shown in FIG. 6A.

A further feature of the invention is provision for selectively pressing and releasing the film-flattening pressure pad manufactured within the cassette to insure proper film positioning with respect to the imaging plane of the lens. Depression and return of the shutter release button 4 is used to exert or relieve the applied pressure.

FIG. 8A shows a pressure plate 107 in dotted outline mounted on the inside surface of the film-chamber door 5 and behind the partition wall 1a. FIGS. 8B–8D show a section view of these elements during the phases of an actuation cycle. The pressure plate 107 has a lug part 108 for exerting a film-flattening force on the pressure pad recess 109 of the disc film cartridge. The pressure plate 107 is held loosely captive by means of pins 111 integral with the film-chamber door 5, and is further held in position by a retainer plate 112 which is also mounted on the inside surface of the film-chamber door 5. The retainer plate 112 also acts as a pivot for the pressure plate 107. The pressure plate 107 further has an actuating arm 110 which is actuable by an actuating arm 114 of a pressure-plate actuator 113. The pressure-plate actuator 113 is pivoted by a pin 115 to a bracket 116 which is integral with the partition wall 1a. The other end of the pressure-plate actuator 113 has two slant surfaces 117 and 118 which are actuable by the control arm 16 of the pressure-plate control lever 13 of FIG. 3A, as shown in FIGS. 8B, 8C and 8D. The slant surfaces 117 and 118 form a V-shaped part. The end of the control arm 16 of the pressure-plate control lever 13 has a V-shaped arrest 119 and a step 120.

In the rest state of the camera 1, the V-shaped part 122 of the pressure-plate actuator 113 falls in the V-shaped arrest 119 of the pressure-plate control lever 13, as shown in FIG. 8B. The length of element 114 is chosen such that in this condition the actuating arm 110 is released so that the lug part 108 exerts a force on the pressure pad recess 109 because of the loading on one end of the pressure plate 107 by means of a spring 121 mounted on the inside surface of the film-chamber door 5. The pressure pad recess 109 in turn is coupled internally within the cassette to exert pressure to the disc film 80 and thereby pressing the film against a generally rectangular shroud (not shown) extending rearwardly into the inserted cassette. Such shrouds are routinely manufactured into disc cameras for this purpose to insure proper positioning of the film in the focusing plane of the lens. This also serves to prevent any rotation of the disc film, otherwise the current exposure frame would move away the framing position, as for example if the camera is jerked accidentally.

During the initial depression of the shutter release button 4, the actuation of the pressure plate 107 is of no consequence because neither is the film being moved in any way nor is an exposure being taken, although the pressure-plate control lever 13 of FIG. 3A is rotating anti-clockwise, and the step 120 is acting on the V-shaped part 122 of the pressure-plate actuator 113. Near the end of shutter button depression, the V-shaped part 122 disengages as shown in FIG. 8C. As a result, the pressure-plate 107 is released and pressure is exerted on the pressure pad recess 109, thereby arresting film rotation and pressing the film to the correct focusing plane while the shutter is released for exposure.

After an exposure is made and the shutter release button 4 is released to return, the pressure-plate control lever 13 rotates clockwise such that the step 120 forces onto the V-shaped part 122 over the slant surface 117. The pressure-plate actuator 113 is thus forced anti-clockwise as shown in FIG. 5D. The pressure-plate 107 is in turn flexed such that the force on the pressure pad recess 109 by the lug part 108 is relieved, and in turn the pressure on the disc film is relieved. As described previously, the film is being rotated during this operation; therefore, the pressure on the film is relieved during the film-transport operation. As a result, first, scratching of the film during transport is minimized and second, less energy is required for the transport. The required tension of the spring 30 is less than would be the case if the pressure on the film were not relieved during film transport.

Thus, in summary shutter and film advancing operations are provided by direct mechanical drive from the shutter button, the drive system further providing for automatic film flattening during shutter release, a double exposure prevention system after the last frame has been exposed, automatic warning of the end-of-film condition, and automatic initial framing advance after cassette insertion.

While for the purpose of illustration, various forms of this invention have been disclosed, other forms thereof may become apparent to those skilled in the art upon reference to this disclosure and, therefore, this invention shall be limited only by the scope of the appended claims.

I claim:

1. In a still camera adapted to utilize photographic film contained within a cassette and advanced in sequential steps to present sequential regions of said film for exposure to image forming light, said cassette including means for inhibiting the further advance of said film at a end-of-film condition, said camera having mechanical film advancing means, mechanical shutter cocking and releasing means, an external accessible actuating member having resilient biasing means associated therewith for urging said actuating member to a first or dormant position and movably responsive to an externally applied force to move to a second or picture-taking position, said shutter cocking and release means and said film advancing means being mechanically coupled to said actuating member to derive their motive power from the operation of said actuating member between said positions thereof, said shutter cocking and release means releasing said cocked shutter when said actuating member is moved to said second position, the improvement comprising:

actuating member movement inhibiting means responsive to said inhibiting of film advance at an end-of-film condition for disabling further operative actuation and normal movement of said actuating member so that the user canot, and he is aware of the fact that he cannot, actuate said film advancing means and said shutter cocking and release means, said camera being provided with a film-receiving chamber adapted to receive a disc film cassette having a film disc disposed therein and mounted on a rotatable hub, said cassette further having an exposure window therein to permit image-forming light to expose a selected region or frame of said film disc, said film disc further hvaing radial peripheral notches thereon, said camera further including support means for supporting said hub and allowing free rotation thereof; a pivotally mounted film advancing member having a film-engaging pawl associated therewith and configured to engage a film notch during rotation of said advancing member in a first or advancing direction to rotate said film disc to bring a new unexposed frame into position, and means for temporarily releasing said pawl from an engaged film notch when said advancing member is rotated in a second or retracting direction; and coupling means for coupling the movement of said actuating member to said advancing member during movement of said actuating member from said first to said second position and thereafter to said first position for moving said advancing member in said advancing and retracting directions to advance the film one frame length and to return the pawl to its initial position.

2. The camera of claim 1, wherein said actuating member movement inhibiting means includes decoupling means for decoupling said advancing member from said actuating member in response to an end of film condition of the film in said cassette, so that said advancing member is prevented from carrying out a full advancing movement, and for preventing said actuating member from tripping said shutter.

3. The camera of claim 1 wherein said means for releasing said pawl includes means for lifting said pawl out of contact with said film during said retraction movement of said advancing member.

4. The still camera of claim 1, wherein said film disc has an initial position which is not a picture-taking position before being loaded into said camera, said camera including door closure means for said chamber movable between chamber opening and chamber closing positions and including manually movable means movable between a first position where the film is safely enclosed within said chamber and a second position for opening or enabling the opening of said chamber to permit a film change operations, and initial film advancing means responsive to movement of said manually movable means for coupling the return movement of said manually movable means to said first position thereof so as to advance said film disc from said initial position to a first picture-taking position.

5. The camera of claim 4 wherein said manually movable means includes latching means for said door closure means and operable between a door closure means latching and unlatching condition, said initial advancing means being operated to advance said film disc upon operation of said latching means from said unlatching to said latching condition.

6. The camera of claim 5 wherein said initial film advancing means advance said film disc from said initial position to said first picture-taking position thereof by operating said film advancing means.

7. The camera of claim 1 further including a movable inertial member, and means for mechanically automatically coupling said inertial member to said advancing member during an advancing stroke during only an end portion thereof of couple the mass of said inertial member thereto during said end portion of said stroke so as to slow down the rate of film advance and inhibit film advance overtravel.

8. The camera of claim 7 wherein said movable member includes at least one rotatable gear member, and said means for coupling said movable inertial member to said advancing member includes gear tooth means disposed on said film advancing member and positioned to engage with said rotatable gear member only when said film advancing member is near the forward or advancing limit of travel thereof.

9. The camera of claim 1 wherein said disc film cassette has a movable wall portion configured to pressingly engage and flatten the region of the film disc presented for exposure to image-forming light, said camera further including pressure applying means mechanically driven by said actuating member for applying a film-flattening force to said movable wall portion of said cassette during said tripping of said shutter and for releasing said force before said film advancing means subsequently advances said film.

10. The camera of claim 9 wherein said shutter is cocked and said film is advanced by movement of said actuating member from said second to said first position thereof.

11. The camera of claim 1 wherein said film advancing means includes means for coupling the force said resilient biasing means to said film to advance said film during movement to said actuating member from said second to said first position thereof, so that the film advancing force applied to said film is governed by the resilient properties of said resilient biasing means.

12. The camera of claim 11 wherein said cassette includes means for inhibiting the further advance of said film at end-of-film condition, and the resilient properties of said elastic biasing means are chosen such that during movement of said actuating member from said second to said first position thereof, said biasing means provides insufficient force to damage said film.

13. The camera of claims 1, 2, 3, or 8 wherein said notches are accessible through said exposure window and said film is advanced by engagement with those notches disposed within said exposure window.

* * * * *